(12) United States Patent
Dant

(10) Patent No.: US 7,584,197 B2
(45) Date of Patent: Sep. 1, 2009

(54) NETWORK-BASED DATABASE COMMUNICATION SYSTEM

(75) Inventor: Robert Dant, Chaska, MN (US)

(73) Assignee: Be-Centric, LLC, Ramsey, MN (US)

( * ) Notice: Subject to any disclaimer, the term of this patent is extended or adjusted under 35 U.S.C. 154(b) by 722 days.

(21) Appl. No.: 10/802,661

(22) Filed: Mar. 17, 2004

(65) Prior Publication Data

US 2004/0249788 A1 Dec. 9, 2004

Related U.S. Application Data

(60) Provisional application No. 60/455,603, filed on Mar. 17, 2003.

(51) Int. Cl.
*G06F 17/30* (2006.01)
(52) U.S. Cl. .............................. 707/100; 707/4; 707/10; 709/203
(58) Field of Classification Search ................... 707/10, 707/104.1, 3, 4, 9, 100, 101; 709/203
See application file for complete search history.

(56) References Cited

U.S. PATENT DOCUMENTS

| | | | |
|---|---|---|---|
| 4,595,911 A * | 6/1986 | Kregness et al. ............. 341/78 |
| 4,791,558 A * | 12/1988 | Chaitin et al. ............... 717/140 |
| 5,119,465 A * | 6/1992 | Jack et al. .................... 717/137 |
| 6,668,260 B2 | 12/2003 | Zoltan |
| 6,671,757 B1 | 12/2003 | Multer et al. |
| 6,829,348 B1 * | 12/2004 | Schroeder et al. ...... 379/265.09 |
| 2002/0016771 A1 | 2/2002 | Carothers et al. ............. 705/43 |
| 2002/0078217 A1 | 6/2002 | Thomas et al. .............. 709/230 |

FOREIGN PATENT DOCUMENTS

| | | |
|---|---|---|
| WO | WO 93/23817 | 11/1993 |
| WO | WO 01/46825 A1 | 6/2001 |
| WO | WO 02/069183 A1 | 9/2002 |
| WO | WO 02/103491 A2 | 12/2002 |

OTHER PUBLICATIONS

Automating the Financial Value Chain, New Microsoft® Solution Simplifies, Integrates, and Automates Financial Exchange between Companies and Banks, Microsoft Publication (2003) (14pgs).
Hill et al., "Data Transformation: Key to Information Sharing", Strategic Analysis Report, (30pgs); Sep. 29, 1998.
Gray, Jim, "Transaction Processing: Concepts and Techniques", Morgan Kaufmann Publishers, Inc. pp. 240-262 (1993).

* cited by examiner

*Primary Examiner*—Cheryl Lewis
(74) *Attorney, Agent, or Firm*—Oppenheimer Wolff & Donnelly LLP

(57) ABSTRACT

The present invention is a communication system. Further, the present invention relates to a database communication system that allows for communication between disparate databases.

40 Claims, 30 Drawing Sheets

```
select * from ipipe_nostro;
```

| country_code | postal_code | host_service | host_service | host_group | end_of_day | nostro_type | nostro_logo | purge_days |
|---|---|---|---|---|---|---|---|---|
| En | RQ3 MN4 | 66.166.45.126 | 1526 | Host Group | 14:45:00 | Bank | | 10 |

170 — (points to 66.166.45.126)
172 — (points to 1526)

Fig. 6A

```
select * from ipipe_nostro_account_transaction;
```
361  363

| vostro_id | vostro_account_transaction_id | bank_transaction_id | value_date_time | value_tms_cle... | clearing_system | account... |
|---|---|---|---|---|---|---|
| 1 | 3467 | BankA2 | 2004-03-04 20:... | 2004-03-04 19:... | CHAPS | 853 |
| 1 | 3468 | BankA3 | 2004-03-04 20:... | 2004-03-04 19:... | CHAPS | 1908 |
| 1 | 3470 | BankA5 | 2004-03-04 20:... | 2004-03-04 19:... | CHAPS | 5946 |
| 1 | 3472 | BankA7 | 2004-03-04 20:... | 2004-03-04 19:... | CHAPS | 6420 |
| 1 | 3473 | BankA8 | 2004-03-04 20:... | 2004-03-04 19:... | CHAPS | 6604 |
| 1 | 3474 | BankA9 | 2004-03-04 20:... | 2004-03-04 19:... | CHAPS | 7255 |
| 1 | 3475 | BankA10 | 2004-03-04 20:... | 2004-03-04 19:... | CHAPS | 9148 |
| 1 | 3476 | BankA11 | 2004-03-04 20:... | 2004-03-04 19:... | CHAPS | 6682 |
| 1 | 3478 | BankA13 | 2004-03-04 20:... | 2004-03-04 19:... | CHAPS | 6603 |
| 1 | 3480 | BankA15 | 2004-03-04 20:... | 2004-03-04 19:... | CHAPS | 1325 |
| 1 | 3481 | BankA16 | 2004-03-04 20:... | 2004-03-04 19:... | CHAPS | 7817 |
| 1 | 3484 | BankA19 | 2004-03-04 20:... | 2004-03-04 19:... | CHAPS | 6133 |
| 1 | 3487 | BankA22 | 2004-03-04 20:... | 2004-03-04 19:... | CHAPS | 9470 |
| 1 | 3488 | BankA23 | 2004-03-04 20:... | 2004-03-04 19:... | CHAPS | 2060 |
| 1 | 3492 | BankA1 | 2004-03-04 20:... | 2004-03-04 19:... | CHAPS | 93 |
| 1 | 3493 | BankA27 | 2004-03-04 20:... | 2004-03-04 19:... | CHAPS | 1111 |
| 1 | 3495 | BankA3 | 2004-03-04 20:... | 2004-03-04 19:... | CHAPS | 8246 |

Fig. 13A

| Transaction Monitor | | | | | |
|---|---|---|---|---|---|
| A/C | BT ID | Sent to Nostro | Received by Nostro | Reconciliation Status | Reconciled By Nostro | Rec. Received By |
| 1 | BankA3 | Mar 4, 2004 8:35:40 PM | | Match | Mar 4, 2004 8:38:12 PM | Mar 4, 2004 8:42:33 PM |
| 1 | BankA27 | Mar 4, 2004 8:34:50 PM | Mar 4, 2004 8:38:15 PM | Match | Mar 4, 2004 8:40:38 PM | Mar 4, 2004 8:41:22 PM |
| 1 | BankA1 | Mar 4, 2004 8:35:40 PM | Mar 4, 2004 8:36:06 PM | Match | Mar 4, 2004 8:40:38 PM | Mar 4, 2004 8:41:05 PM |
| 1 | BankA23 | Mar 4, 2004 8:34:19 PM | Mar 4, 2004 8:35:08 PM | No Match | Mar 4, 2004 8:38:21 PM | Mar 4, 2004 8:40:44 PM |
| 1 | BankA22 | Mar 4, 2004 8:34:19 PM | Mar 4, 2004 8:35:08 PM | Partial Match | Mar 4, 2004 8:35:46 PM | Mar 4, 2004 8:36:11 PM |
| 1 | BankA19 | Mar 4, 2004 8:33:32 PM | Mar 4, 2004 8:33:40 PM | Match | Mar 4, 2004 8:34:03 PM | Mar 4, 2004 8:35:03 PM |
| 1 | BankA16 | Mar 4, 2004 8:32:48 PM | Mar 4, 2004 8:33:35 PM | Match | Mar 4, 2004 8:34:03 PM | Mar 4, 2004 8:35:03 PM |
| 1 | BankA15 | Mar 4, 2004 8:32:13 PM | Mar 4, 2004 8:33:04 PM | Match | Mar 4, 2004 8:34:03 PM | Mar 4, 2004 8:35:03 PM |
| 1 | BankA13 | Mar 4, 2004 8:32:13 PM | Mar 4, 2004 8:32:23 PM | Match | Mar 4, 2004 8:34:03 PM | Mar 4, 2004 8:35:03 PM |
| 1 | BankA11 | Mar 4, 2004 8:31:45 PM | | Match | Mar 4, 2004 8:32:14 PM | Mar 4, 2004 8:34:08 PM |

Fig. 27

NETWORK-BASED DATABASE COMMUNICATION SYSTEM

CROSS-REFERENCE TO RELATED APPLICATION(S)

This application claims priority from U.S. provisional application No. 60/455,603, filed Mar. 17, 2003, which is hereby incorporated by reference in its entirety.

FIELD OF THE INVENTION

The present invention relates to inter-database communication systems. More specifically, the present invention relates to a seamless communication system between at least two disparate databases.

BACKGROUND OF THE INVENTION

There are several existing communication systems or methods for exchanging or transferring data for electronic commercial transactions. Such communication technologies are typically used for exchange of information between existing application systems for the purpose of completing electronic commercial transactions.

Generally, the goal of such systems is the exchange of information in the following exemplary fashion. When a business transaction is completed at a first application system, it may be desirous for some reason to communicate the information related to the transaction to a second application system. For example, if a person in a bank in Europe wants to deposit funds in the European bank for the purpose of transferring the funds to a U.S. bank, it would be necessary to communicate the transaction that occurs at the European bank to the U.S. bank. When the second application system receives the communication, the system performs the action required as a result of the communication (the "required action"). Further, once the required action has been taken, it may be desirable for the second application system to communicate the results of the action back to the first application system. For example, the person in the European bank will want confirmation from the U.S. bank regarding receipt of the funds at the U.S. bank. This is the typical method for achieving the goal of information exchange as it relates to electronic transactions.

One example of an existing communication system is a messaging system. An information exchange as summarized above takes place in the following manner for an existing messaging system as depicted in FIG. 1. When a business transaction is completed at a first database 18, a first application system 10 associated with the database 18 first must determine the destination of a message relating to the business transaction. Based on the destination, the appropriate standard message format for the second or receiving application system 34 must be selected by the first application system 10. As will be explained further below, a typical messaging system typically uses only one or two standard message formats, because of the complexity and time involved in making each application system in a messaging network compatible with a new format. The first application 12 then converts the transaction information into the selected message format 14. The system 10 then places the message, in the proper format, into a message queue 20 that communicates with the messaging system 22. The messaging system 22 routinely searches the queue 20 for messages and pulls any appropriate message from the queue 20 and sends the message to the appropriate communication device 24 within the system. The communication device 24 identifies the target address of the message and transmits the message over a network 26 to the appropriate communication device 28 that is in communication with the target system 34. In some networks, the receiving communication device 28 will send a confirmation message back to the sending communication device 24, indicating receipt of the message. The receiving communication device 28 delivers the message to the appropriate message queue 32 at the appropriate second or receiving application system 34, where the message is stored until the appropriate second application system 34 retrieves the message from the queue 32. Subsequently, the second application 36 reads the message from the message queue 32 and performs the required action, which includes both completing the action and writing a completion status back to the second system's existing application database 42. At this point, if a confirmation at the first application system 10 is desirable, the second application system 34 must affirmatively create and send a separate message in the proper format back to the first application system 10 over the messaging system in a reverse of the process described above.

Examples of this technology include Electronic Data Interchange (EDI) and Extended Markup Language (XML). Further examples include standardized industry networks for sending and receiving EDI and XML messages such as proprietary financial transaction networks like SWIFT, FedWire, and RTGS.

A similar application-to-application communication technology relates to web service or .net design systems. These systems are similar to the messaging systems in that they are separate, independent, one-way, one-time, application-to-application message systems. The information exchange takes place in the following manner for an existing web service, which is depicted in FIG. 2. The existing web service technology provides an independent, separate communication facilitator accessible over the Internet or any network. More specifically, the web service is dedicated to facilitate communication between a specific application at an application system and other application systems. Thus, each application system must establish its own web service application on the network for each application that it wants to make accessible for communication over the network.

Upon completion of the business transaction at the first database 52, the first or sending application system 50 must determine the appropriate receiving or second application system 76, then locate the web service application 68 for the appropriate receiving application system 76. Once the first application system 50 has identified the appropriate web service application 68, the system 50 formats its transaction information into the appropriate data format to be compatible with the appropriate receiving web service application 68. The web service call application 62 of the sending system 50 then electronically "invokes" the appropriate receiving web service application 68. When the connection is established, the receiving web service application 68 must perform with its security application 70 an authentication to ensure that the web service call application 62 is authorized to invoke the receiving application 68. Then, the web service call application 62 of the first application system 50 transmits the formatted message to the receiving web service application 68. The web service application 68 receives the message and validates the format of the transaction information. Then, the receiving web service application 68 invokes the appropriate previously established business logic at the business logic application 72 and communicates the transaction to the database 78 at the receiving application system 68. Alternatively, the receiving web service application 68 may invoke the appropriate application in the receiving application system 76 and the appropriate application invokes the appropriate business logic and communicates the transaction to the database 78 at the receiving application system 76. In some two-way web service networks, the receiving web service application 68 can communicate back to the sending web service call application 62 the status or completion of the business transaction.

Thus, there is a need in the art for a communication system that provides compatibility between disparate databases and allows for two-way exchange of information with automatic confirmation of successful exchange. Further, there is a need for a communication system that allows for direct communication between databases without the need for application-to-application communication to drive the information exchange. In addition, there is a need for a communication system that provides sufficient flexibility to add or adjust compatibilities quickly and easily to allow for communication with new database systems or database systems that have changed the format of their communications.

BRIEF SUMMARY OF THE INVENTION

The present invention, in one embodiment, is a database communication network. The network comprises a first database system, a second database system in communication with the first system, and an identification system in communication with the first and second systems and configured to provide a database identification to each of the first and second database systems.

The present invention, in another embodiment, is a database system. The system comprises: a database and a matching component in communication with the database. The matching component is configured to receive information regarding an expected transaction and compare the information regarding the expected transaction with information regarding an actual transaction at the database.

In an alternative embodiment, the present invention is a database system. The system comprises a database, a sync application, and a communication component. The sync application is configured to receive first outgoing information from the database. The communication component is configured to identify a target database system to receive the first outgoing information. Further, the sync application is configured to transmit the first outgoing information to the target database system.

In a further embodiment, the present invention is a database system on a network. The database system comprises a database and an identification application in communication with the database. The identification application is configured to apply a unique identification to a record in the database, whereby the record has a unique record identification in the network.

In a further embodiment, the present invention is a database communication network comprising a first database system, a second database system in communication with the first database system, and an identification system in communication with each of the first and second database systems. The first database system comprises a first database configured to receive data and a first server. The first server comprises a first communication component configured upon receipt of data into the first database to identify a database system in communication with the first database system to receive first information and transmit the first information out of the first database. The second database comprises a second database configured to receive data and a second server. The second server comprises a second communication component configured upon receipt of data into the second database to identify a database system in communication with the second database system to receive second information and transmit the second information out of the second database. The identification system is configured to provide a database identification to each of the first and second database systems.

The present invention, in a further embodiment, is a communication network comprising at least two database systems and at least one external system. Each of the at least two database systems comprises a database, a server associated with the database, and a connection component in communication with the database. The server comprises a communication component configured to receive outgoing information from the database, identify at least one of the at least two database systems to receive the outgoing information, and transmit the outgoing information to the at least one of the at least two database systems. Each of the at least one external systems is in communication with the connection component of one of the at least two database systems.

The present invention, in an additional embodiment, is a method of network-based communication. The method comprises designating a unique identifier for a database system on a network, wherein the unique identifier provides a unique identification across the network for each record in the database system. The method further comprises establishing synchronized communications between the database system and any other database system on the network.

In an alternative embodiment, the present invention is a method of network-based communication. The method comprises automatically transmitting information out of a first database with assistance from a first transmission component within the first database upon input of data into the first database. The method further comprises adding time information to the information and transmitting the information to a second database.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 6A is a diagram of a representative screenshot depicting receipt at a database system of identification information of another system, according to one embodiment of the present invention.

FIG. 13A is a diagram of a representative screenshot depicting an exemplary set of records relating to transactions at a database, according to one embodiment of the present invention.

FIG. 27 is a diagram of a representative screenshot depicting a transaction monitor configured to track transactions at a database system and communications with another database system, according to one embodiment of the present invention.

DETAILED DESCRIPTION

The present invention, according to one embodiment, allows for communication between disparate databases. Further, the present invention allows for communication between disparate databases at disparate entities. In some embodiments, the present invention provides for software at any databases in a network wherein the software enables communication between databases at disparate sites. According to one aspect of the invention, the method and system of the present invention provides unique identification of each record in a database. According to an alternative aspect, the present invention allows for direct communication between databases. In a further alternative, the present invention provides for communication between databases that utilize different communication formats or languages. In yet another alternative, the present invention allows for communication between databases that triggers transmission of information to a third database, system, or file that is external to the network, thereby allowing for more complex communications. According to one alternative embodiment, the system and method of the present invention can be used in the financial industry to enable communications between financial institutions.

Figure 1:
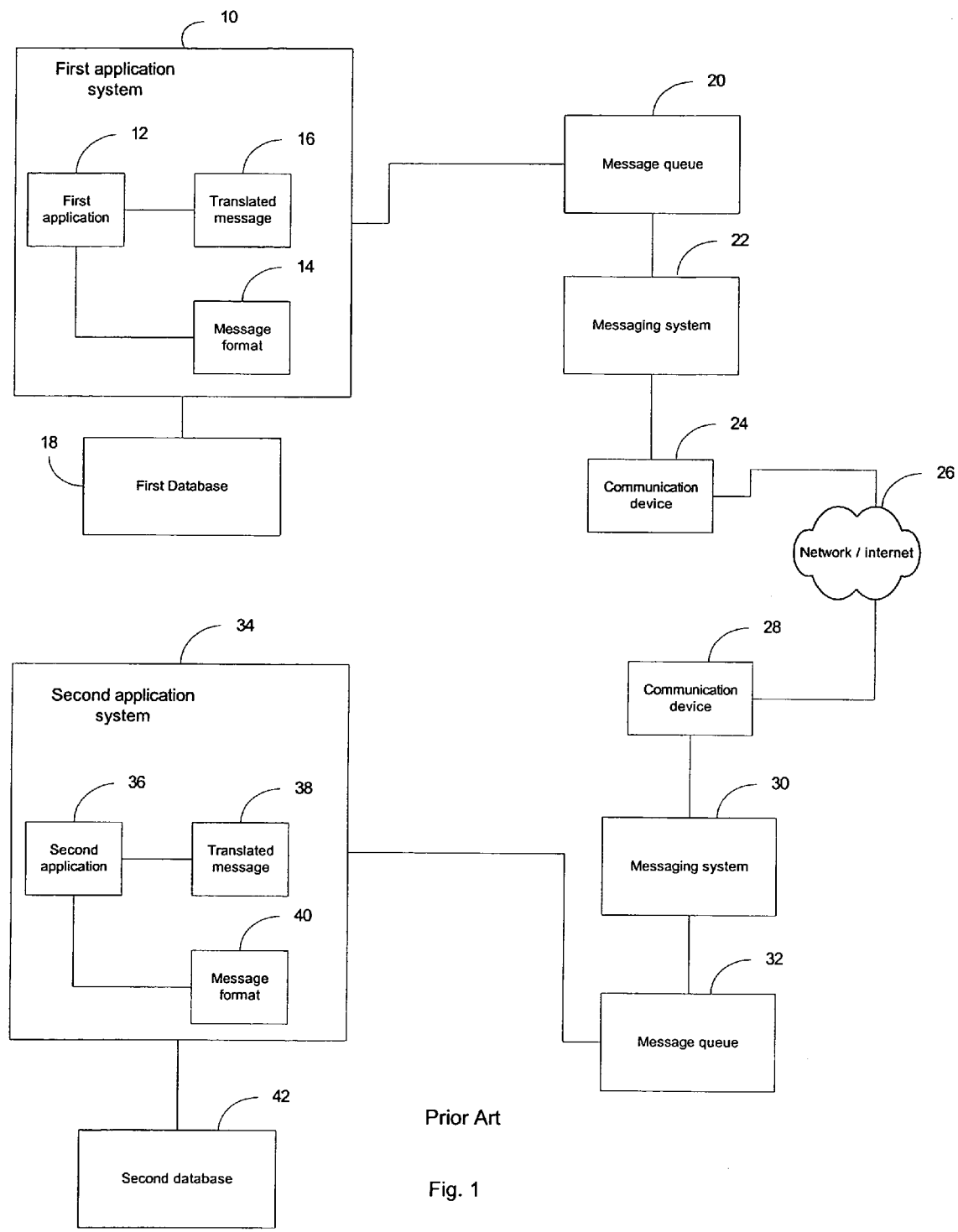
FIG. 1 is a schematic diagram illustrating the architecture of an exemplary existing messaging system.
Figure 2:
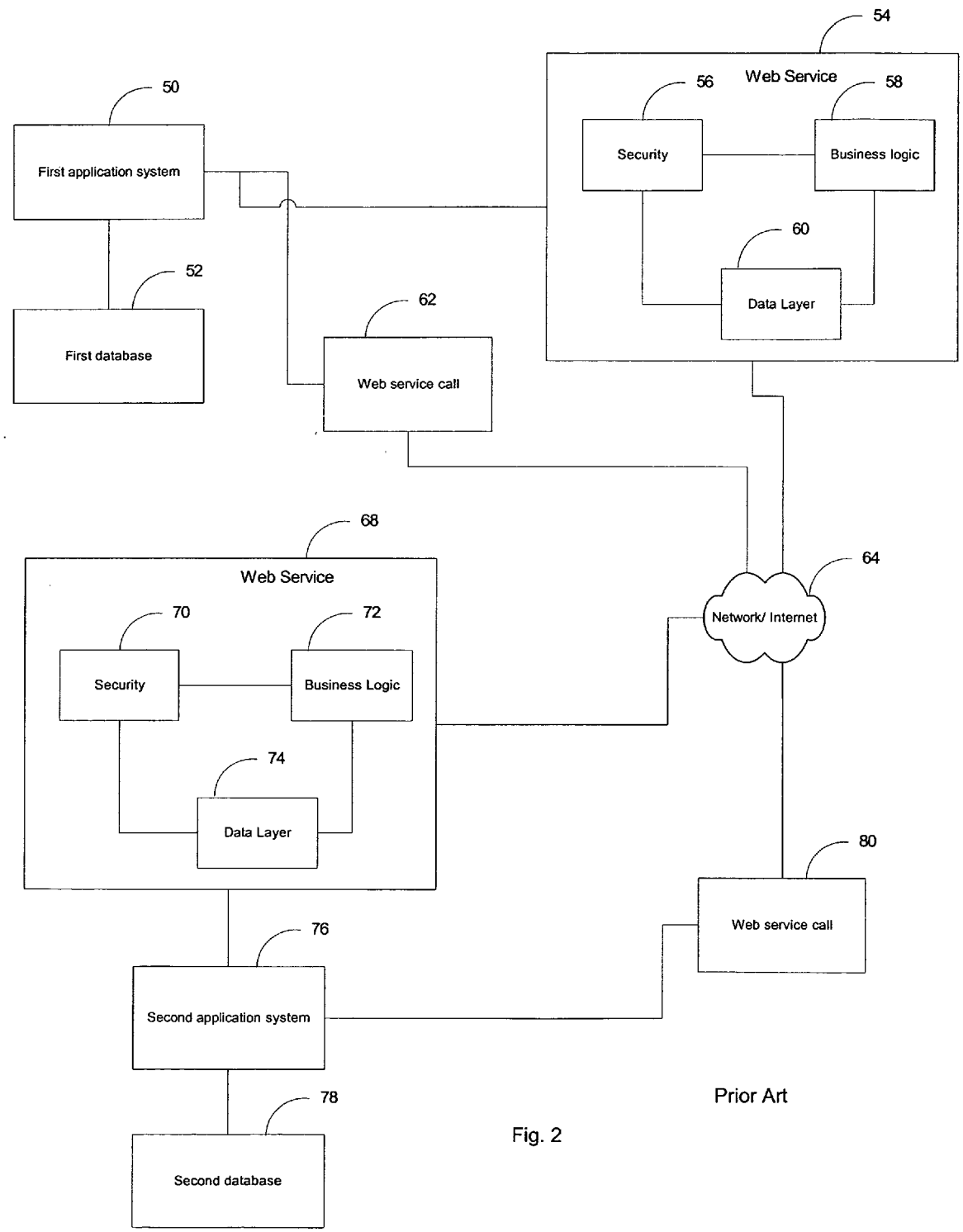
FIG. 2 is a schematic diagram illustrating the architecture of an exemplary existing web service system.
Figure 3:
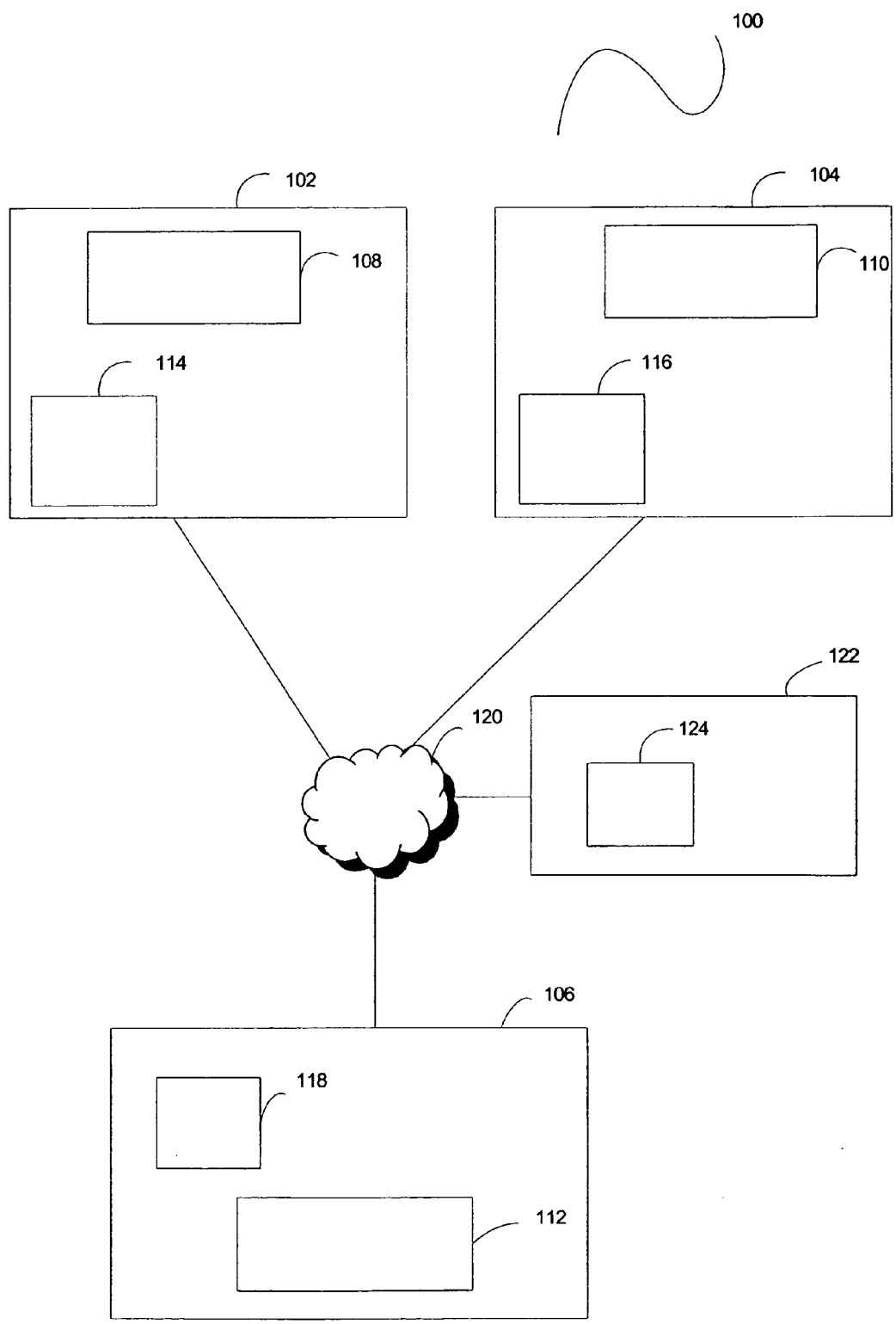
FIG. 3 is a schematic diagram illustrating the architecture of a network-based communication system, according to one embodiment of the present invention.

FIG. 3 depicts a communication network 100, according to one embodiment of the present invention. The communication network 100 has three database systems 102, 104, and 106 capable of communication over a network 120, which in one embodiment is the Internet. Each system 102, 104, and 106 has a database 108, 110, and 112 and database software 114, 116, and 118. According to one embodiment, the network 100 includes an identification system 122 capable of communication with the database systems 102, 104, and 106 over the network 120.

The network 100 of the present invention provides several advantages over the existing technologies. For example, the network 100 allows for direct communication between database systems without the need for intermediate systems to handle the communications, even if each system 102, 104, and 106 is located at separate, independent entities such as different companies or entities in the same industry or even different companies or entities in different industries. That is, according to certain embodiments, the communication system of the present invention requires no intermediate entity or conduit, and instead allows for communication directly between each database system. Alternatively, the system of the present invention can have an intermediate entity or entities between each system.

Further, the database systems 102, 104, and 106 are configured to allow for seamless communications between systems with different formats or languages, such that database system 102 can communicate directly with system 104 even if the two systems utilize different languages. That is, the system of the present invention, according to some embodiments, allows for communication between databases having different formats with no compatibility problems and no reconfiguration requirements.

In addition, the database systems 102, 104, and 106, according to a further embodiment of the present invention, are configured to allow for linked, two-way communication. That is, when an initial communication from database system 102 is transmitted to database system 104 and successfully written into the database 110, the receiving database 104 automatically and immediately transmits a return communication back to the transmitting database 102 confirming that the initial communication was successfully written into the database 110. As such, the communication system of the present invention, according to certain embodiments, provides for immediate confirmation that a communication has been written into the receiving database. Alternatively, the system and method of the present invention provides for communications without immediate confirmation.

The network 100 of the present invention, in accordance with a further embodiment, allows for transmitting information from a database system 102 to an external system (not shown). Further, a database system 104 may transmit a communication to database system 102 that triggers the database system 102 to transmit information to the external system (not shown). This process is sometimes called "straight through" transaction processing ("STP processing") and will be described in further detail below.

According to one embodiment, the above features of the network 100 and databases 102, 104, and 106 of the present invention are provided by the software 114, 116, and 118 residing on the database systems 102, 104, and 106 and the software 124 residing on the identification system 122. The software 114, 116, 118, and 124 is configured, according to one embodiment, to provide a unique identification ("unique ID") to each database 108, 110, and 112. This unique ID can be helpful in providing for communication between the database systems 102, 104, and 106. In accordance with a further embodiment, the software 114, 116, and 118 is configured to identify other database systems for communication purposes. For example, the software 114 at database system 102 identifies database system 104 and the software 116 at system 104 identifies system 102 when communication between the systems 102 and 104 is desirable.

Further, the software 114, 116, and 118, according to another aspect of the invention, is configured to provide for translation of a communication into a format compatible with the receiving database prior to transmission of the communication. For example, the software 114 at system 102, prior to transmission of a communication to system 104, is configured to translate the communication into a format compatible with the database 116 at system 104.

In addition, the software 114, 116, and 118, in accordance with a further embodiment of the present invention, is configured to allow for matching an expected communication with the actual communication received at a database. For example, the software 114 at system 102 allows information to be entered at the system 102 relating to a communication that is expected to be received at the database 108 from database system 104, and further allows for comparing that information with the actual communication when it is received. In a further embodiment, the software 114 is configured to transmit a notification to database system 104 regarding whether the actual communication from system 104 matches the expected information.

Further, the software 114, 116, and 118, according to another embodiment of the present invention, is configured to provide for communication between a database system and an external system (not shown). For example, database system 102 is in communication with an external system (not shown). The software 114 can be configured to allow for the communication connection between the system 102 and the external system (not shown) and further allow for exchange of communications and information between the system 102 and the external system (not shown).

The software 114, 116, and 118, in accordance with a further embodiment, is configured to allow for logging and/or tracking unsuccessful transmissions of communications between databases. For example, if database system 102 attempts to transmit a communication to system 104, the software 114 is configured to track and/or log the communication if the system 104 is malfunctioning and the communication cannot be successfully transmitted to the system 104. Further, according to one embodiment, if database system 104 attempts to transmit a communication to system 102, the software 114 is configured to track and/or log the communication if the system 102 is malfunctioning and the communication cannot be written to the database 108.

The communication system of the present invention is applicable in any electronic transaction. Thus, the system is applicable in any industry that can or may utilize e-commerce. For example, the system is applicable in the financial industry or any financial transactions. Further, the system is applicable in the financial market for cash exchange (such as the foreign exchange market), the securities market, or the derivatives market. Alternatively, the system is applicable to the insurance industry or any industry utilizing supply chain management. In a further alternative, the communication system of the present invention is applicable in any e-commerce industry. Further, the system is applicable for any communication between database systems over a network.

Figure 4:
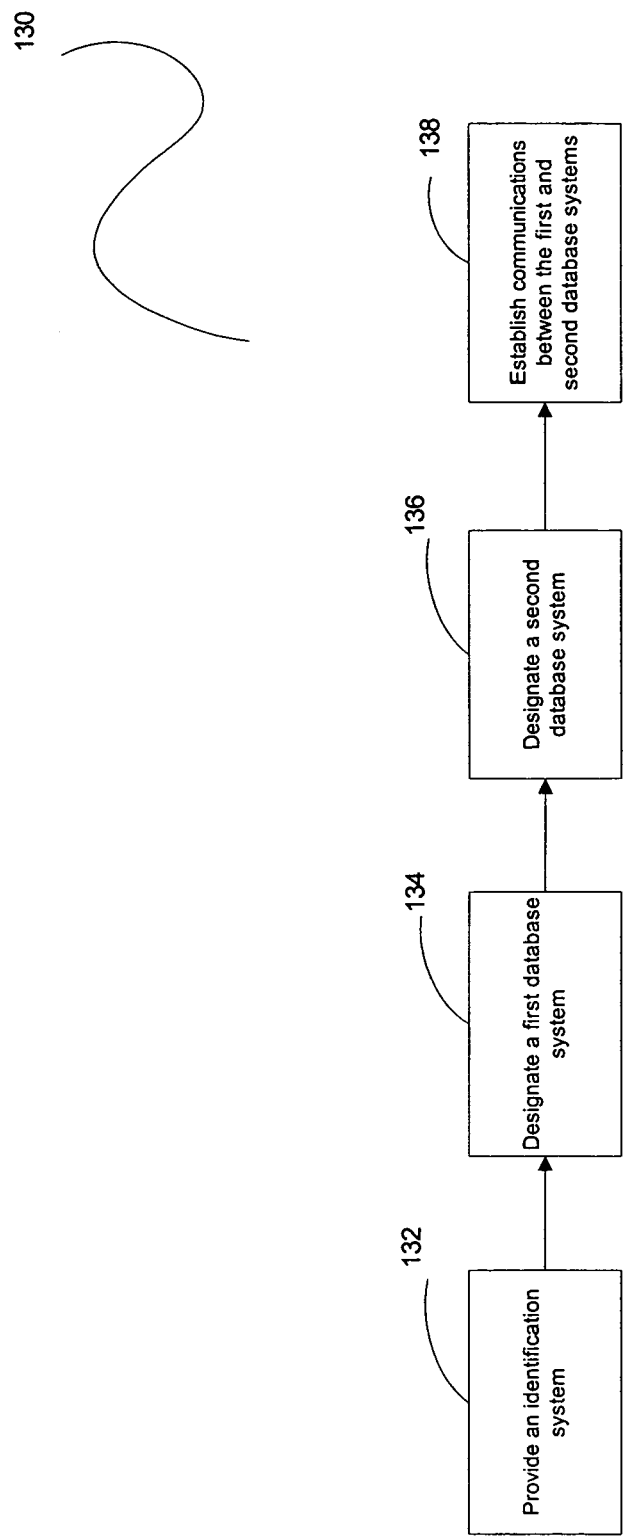
FIG. 4 is a flowchart showing the establishment of a network-based communication system, according to one embodiment of the present invention.

According to one embodiment, a system of the present invention must be set up or established before communications can be transmitted between the database systems. FIG. 4 shows the steps involved in establishing a communication system between databases 130, according to one embodiment of the present invention. Generally, the establishment of the system 130 includes providing an identification system (block 132), designating a first database system (block 134), designating a second database system (block 136), and establishing communications between the first and second data systems (block 138). Alternatively, the establishment of the system includes designating a plurality of systems and establishing communications amongst those systems.

Figure 5:
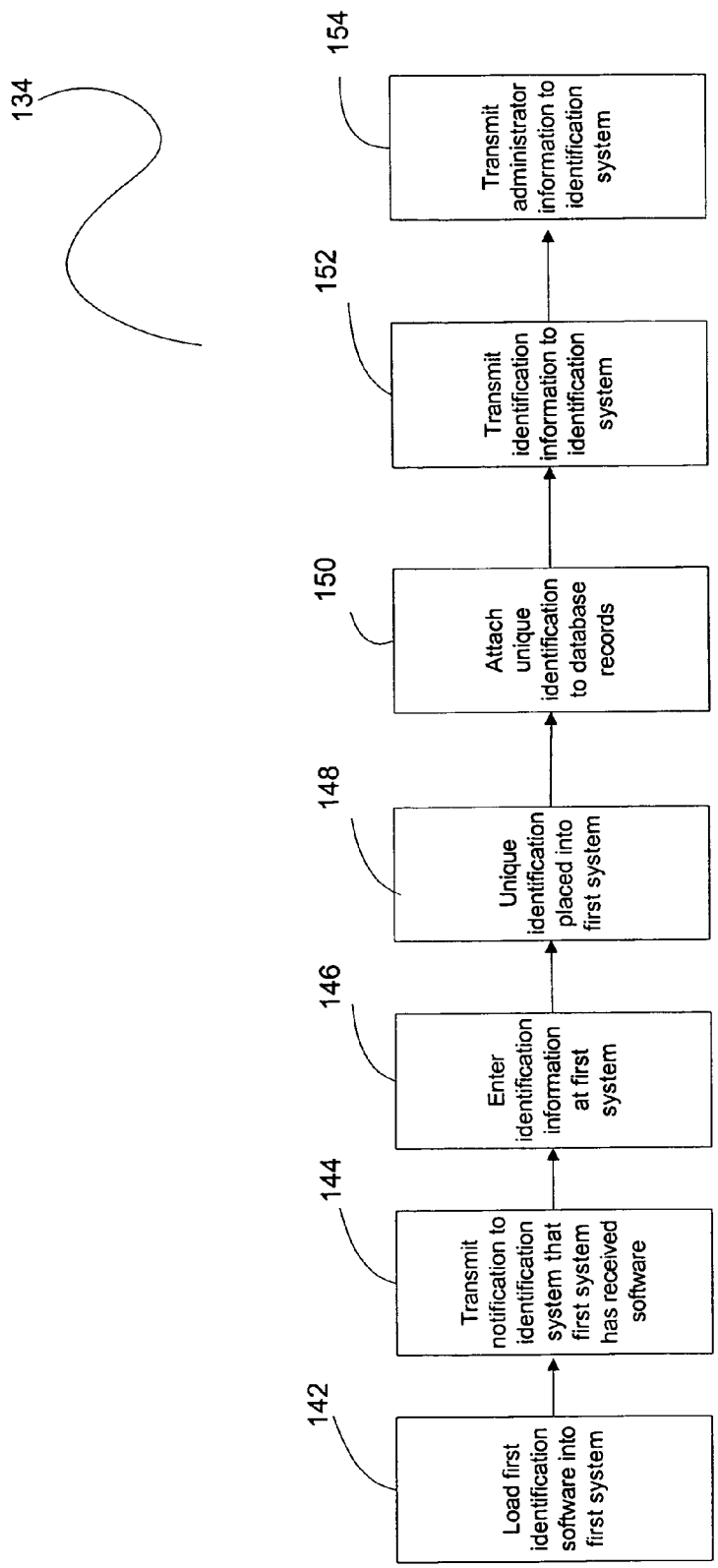
FIG. 5 is a flowchart depicting the designation of a first database system, according to one embodiment of the present invention.

FIG. 5 depicts the designation of a first database system 134 according to one embodiment. "Designation" is intended to mean providing a database system with the appropriate software of the present invention and implementing that software to allow that system to communicate within the network of the present invention. In one embodiment, identification and communication software is loaded into the first system (block 142). The communication software includes the software components necessary for the first database to communicate with other databases according to the present invention. The identification software includes the software necessary to provide a unique ID to the first database, which will be explained in further detail below. According to one embodiment, the software is transmitted to the database system by the identification system. Alternatively, the software is placed into the system by any known method. Upon loading the software into the system, according to one embodiment a communication is transmitted to the identification system providing notification that the first database system has received the software and is capable of communication on the network of the present invention (block 144). Upon loading it into the first system, the software according to one embodiment allows for entering at the first system identification information related to the first system (block 146). According to one embodiment, the software provides a set of pre-determined entry fields at an interface such as a personal computer that allows for manual entry of the identification information by a user. Alternatively, the information is entered by any known method. In a further alternative, no identification information is provided.

In addition, the unique ID is placed into the first system (block 148). According to one embodiment, the unique ID is placed into the system by the identification software. Alternatively, the unique ID is placed into the system manually by a user entering the unique ID at an interface with the first system. In a further alternative, the unique ID is placed into the system by any known method. According to one embodiment, the ID is placed into the first system in the form of software that is placed on a server at the first system. The unique ID allows for seamless communication amongst all the database systems in a network. By assigning a unique ID to each database system, each system can be easily identified and distinguished from the rest of the systems on the network. Thus, each system is unique within the network such that one system can easily identify any other system with which it communicates.

In accordance with a further aspect of the invention, the first system attaches the unique ID to each record in its database (block 150). According to one embodiment, the software attaches the unique ID to every new record by first defining a table in the database with a field for the unique ID. From that point on, whenever a new record is created, the field is automatically populated with the unique ID. For existing records present in the database at the time the identification software is placed into the system, the unique ID is added to each record by unloading the existing records from the database and writing those records back into the database, whereby the above process results in the unique ID field in the table being populated with the unique ID. Alternatively, the unique ID can be added to existing and new records by any known method. As a result, every record in the first system database—and every record in every database with a unique ID—is unique across the entire network. By uniquely identifying each record across the network, the problem of a record being sent out into the network with a record ID that is identical to another record in the network is eliminated, thereby eliminating the communication breakdowns caused by identical record IDs.

Figure 5A:
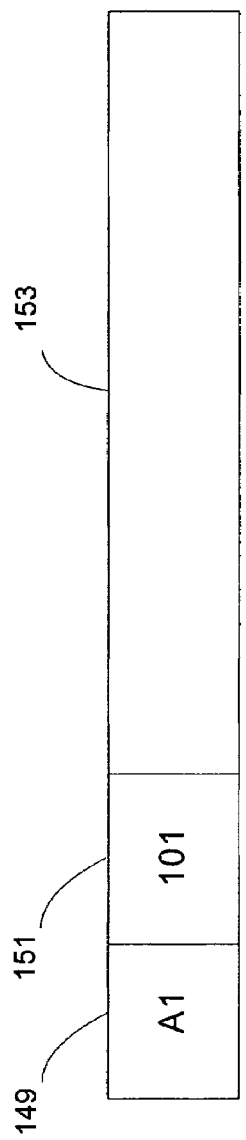
FIG. 5A is a diagram depicting an exemplary representative database record, according to one embodiment of the present invention.

An exemplary, representative database record is depicted in FIG. 5A, according to one embodiment of the present invention. The database record has at least three fields, with one field being the unique ID field 149, which contains the unique ID associated with the database system in which the record resides. In the exemplary record in FIG. 5A, the unique ID is "A1". Another field is the standard record ID field 151, which contains the unique number assigned to each record in a database. In the exemplary record of FIG. 5A, the standard record ID is "101". The combination of the unique ID and the standard record ID provide a unique record ID that is unique across the network to which the database system containing the record is connected. Thus, for example, no other record across the entire network will have the unique record ID of "A1 101" that is shown for the exemplary record in FIG. 5A. In addition, the third field 153 includes the additional relevant information carried in the record. According to one embodiment, the additional information is contained in more than one field, such that there may be a fourth, fifth, or more fields containing relevant information.

According to one alternative embodiment, upon entry at the first system, the identification information, including the unique identifier, is transmitted to the identification system (block 152). That is, the first system transmits the identification information to the identification system. According to one embodiment, the identification software performs the transmission. Alternatively, the information is transmitted from the first system to the identification system by any known method. In a further alternative, the first identification information can be provided to the identification system by any known method. In a further alternative embodiment in which there is no identification system, the identification information is not transmitted. The first identification information, according to one embodiment, may include, without limitation, the unique identifier, a company name associated with the system, a company branch name, a company address, a company branch address, a host address, a network address and any other relevant information.

In one alternative to the present invention, the first system also transmits first system administrator information to the identification system (block 154). The first system administrator information may include the name and contact information for the administrator at the first system. The first administrator information, according to one embodiment, may also include, without limitation, the administrator's job title, the administrator's phone number, the administrator's fax number, the administrator's pager, the administrator's mobile phone number, the administrator's e-mail address, the unique identifier, and any other relevant information. This information may be transmitted for the purpose of making contact information available at the identification system that can be used to contact the administrator at the first system if necessary.

According to one embodiment, the designation of any further database system to be included in a network of the present invention occurs in the same way as the designation of the first system. Thus, the designation of the second system (block 136) can occur in the same fashion as the first system.

Figure 6:
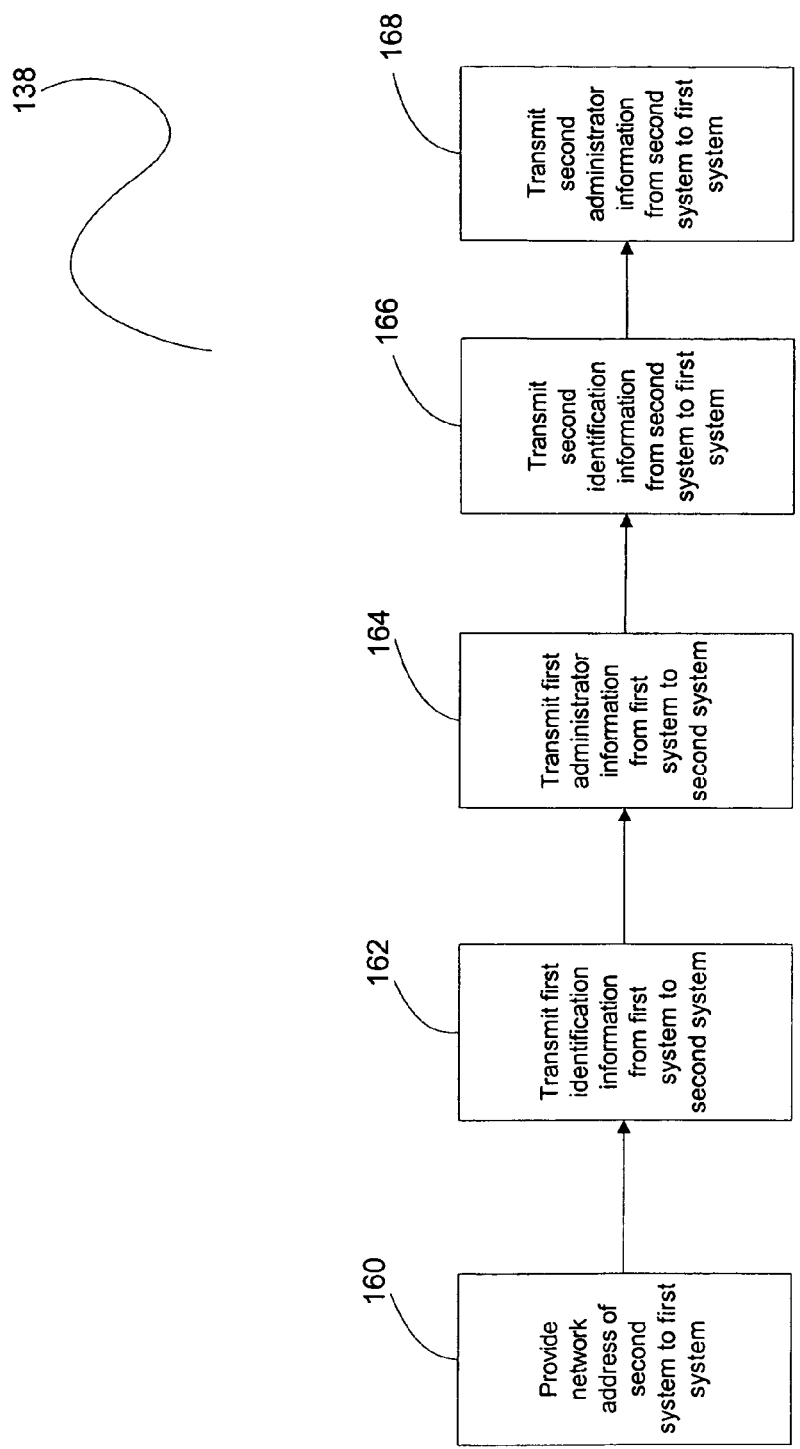
FIG. 6 is a flowchart showing the establishment of communications between the first and second systems, according to one embodiment of the present invention.

Once the identification and communication software has been installed in the databases of two database systems such as the first and second systems, those two systems now have the software required to enable the systems for communication with each other or any other system having the software as disclosed herein. In order to communicate, however, the systems according to one embodiment must first exchange certain information (also referred to as "establishing communications"). FIG. 6 depicts the establishment of communications between the first and second systems 138, according to one embodiment of the present invention. The network address of the second system is provided to the first system (block 160). The network address may be an I.P. address, a host name, a DNS designation, or any other known network address. According to one embodiment, the network address is manually entered by a user at an interface at the first system. Alternatively, the network address of the second system is electronically transmitted to the first system.

Using the second system's network address, the first system transmits to the second system the first system's identification information (block 162). Typically, the identification information is transmitted electronically over the network from the first system to the second system. According to one embodiment, the software at the first system enables the transmission of the identification information to the second system. Alternatively, the first system's identification information is transmitted to the second system by any known method. In an alternative embodiment, the first system also transmits the first administrator information to the second system (block 164). The second system transmits to the first system the second system's identification information (block 166). According to one embodiment, any account information exchange between the first system and the second system cannot occur until the first system's identification information has been successfully transmitted to the second system and the second system's identification information has been successfully transmitted to the first system. Typically, the software at the first system is configured to prevent the account information exchange until the identification information has been exchanged. The second system may also transmit the second system's administrator information to the first system (block 168). According to an alternative aspect of the present invention, upon exchange of the identification information of each system, the first and second system's unique IDs are transmitted together to the identification system. According to one embodiment, this information can be stored at the identification system to indicate which systems on the network have established communications with each other.

FIG. 6A is a depiction of a screen shot showing the receipt at a database system of the identification information of another system, according to one embodiment of the present invention. Thus, according to one embodiment, FIG. 6A shows the first system's identification information as stored at the second system. The identification information includes, in this embodiment, an IP address for the first system 170 and a port number for the first system 172, thus making it possible for the second system to transmit communications to the first system at the IP address and port number. This information is retained at the second system and utilized when a communication must be sent to the first system.

Figure 7:
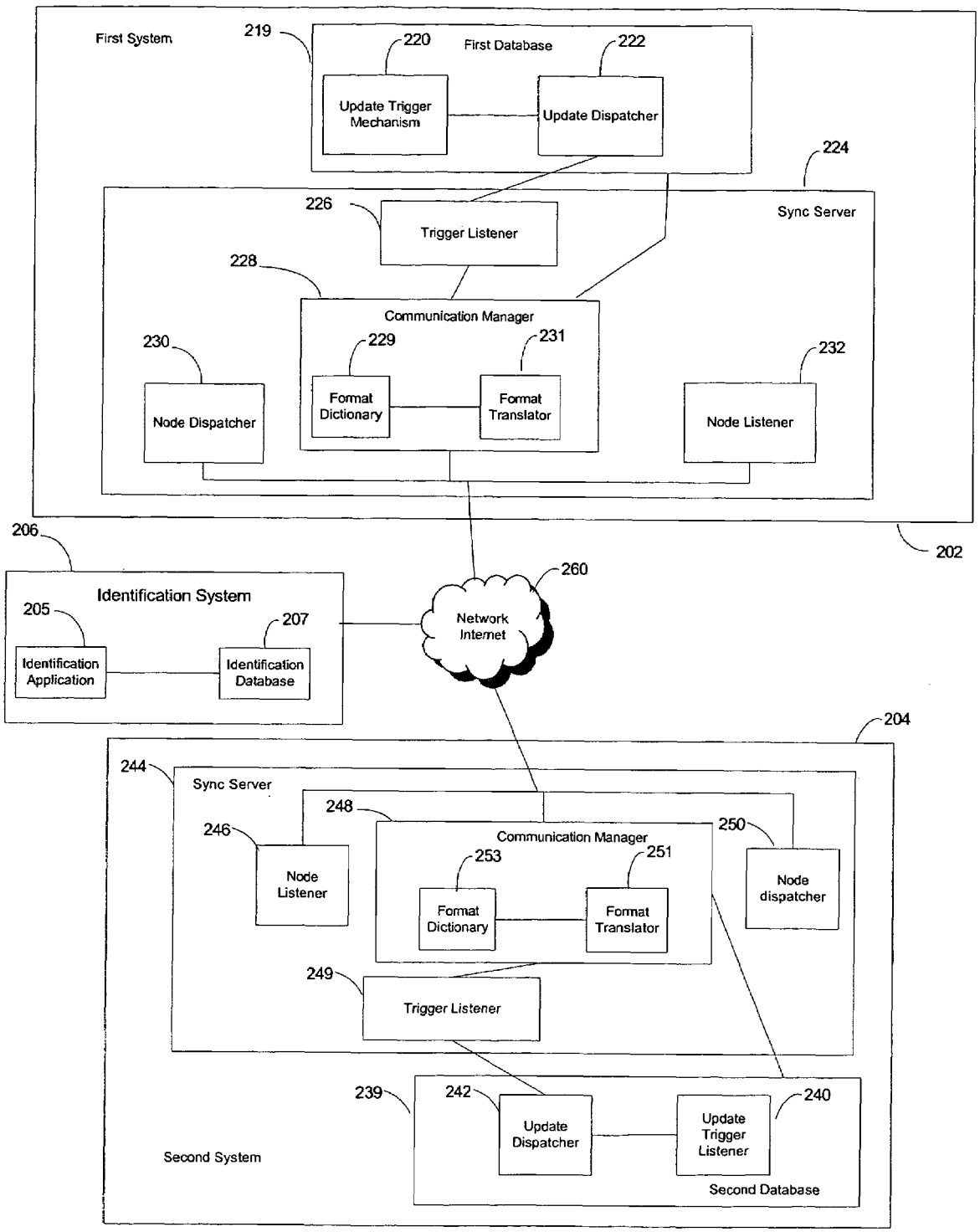
FIG. 7 is a schematic diagram illustrating the architecture of a network-based communication system according to one embodiment of the present invention.

FIG. 7 shows the architecture of a network-based communication system according to one embodiment of the present invention. In this embodiment, the system includes a first database system 202, a second database system 204, and an identification system 206, all of which are in communication with each other over a network 260. According to one embodiment, the network is the Internet. Alternatively, the network is an intra-entity network such as a local area network. In a further alternative, the network can be any known network.

The first system 202 has a first database 219 and a sync server 224. The sync server is an application that controls or assists with the synchronization of communications between the first database system and any other database system. The term "sync server," for purposes of this application, shall include, but is not limited to, any application in a database system that assists with, allows for, oversees, manages, or controls communication synchronization between databases or database systems. The first database includes an trigger mechanism 220 and a dispatcher 222. The trigger mechanism 220 and dispatcher 222 are known components of many existing databases, and are configured to operate to transmit an electronic signal when data has been written into a database as will be described in further detail below. The terms "trigger mechanism" and "dispatcher" are not to be limiting, but rather are intended for purposes of this application to refer to any known components for performing the tasks as described herein. Typical trigger mechanisms and dispatchers are found in such databases as Oracle, DB2, or Informix databases and generally transmit an electronic signal to an application external to the database.

The sync server 224 has a trigger listener 226, a communication manager 228, a node dispatcher 230, and a node listener 232. According to one embodiment, the sync server is a set of JAVA instructions, or any other known programming language, that defines how the trigger listener 226, communication manager 228, node dispatcher 230, and node listener 232 work together. That is, it controls the electronic communications or messages between those components. The trigger listener 226 of the present invention is a software application that is configured to receive the electronic signal or "communication" from the dispatcher 222. According to one embodiment, the signal includes information identifying the location of the information that was written into the database. For example, according to one embodiment, the signal from the dispatcher simply identifies the database record. The trigger listener 226 is configured to use the database record identification to retrieve the record.

The communication manager 228, according to one embodiment, is a software application configured to receive or retrieve information from the first database 219 and configure the information for transmission to the second database system 204. According to one embodiment, it creates and formats a message or communication for transmission to the second database based on the information received or retrieved from the first database 219. The manager 228 has two further software applications: a format dictionary 229 and a format translator 231.

The format dictionary 229 is a database configured to store any electronic communication formats utilized by any database system connected to the network of the present invention. The electronic communication formats can be any known format for electronic communication, including message system formats, XML formats, EDI formats, or any other known electronic communication formats. The dictionary 229 can have any known database configuration. The format information can be stored in the dictionary 229 in XML DDT format or in the standard database record layout. According to one embodiment, the appropriate format is identified in the dictionary 229 for each system connected to the network of the present invention such that the dictionary 229 serves as a reference for the appropriate format to use for each system. According to one embodiment of the present invention, the dictionary 229 is configured to be easily updated with new formats or new systems utilizing a particular format.

The format translator 231 is an application configured to format an outgoing electronic communication into a format compatible with the receiving database system. That is, the translator 231 is configured to utilize the dictionary 229 to re-format the outgoing communication into the format known to be compatible with the receiving system. The translator 231 can be any known application for converting the format of an electronic communication to an appropriate format for the receiving system.

The node listener 232 is a software application configured to receive any incoming communications and provide a filter function relating to those incoming communications. That is, the listener 232 is configured to determine whether the incoming communication is intended for the first system 202, rejecting any communication that is not valid or not intended for the first system and accepting valid communications based on the appropriate information contained in the communication. For example, according to one embodiment, the communication may be identified as valid based on the unique ID or certificate of the system that sent the communication or the protocol of the communication. Thus, the listener 232, according to an alternative embodiment, serves a filtering and security function.

The node dispatcher 230 is a software application configured to transmit electronic communications utilizing any "address" information or other information related to the appropriate system to which a communication is to be sent. Further, it is a set of instructions in programming code configured to receive electronic communications from the communication manager 228 and format or "package" the communication and transmit the communication to the appropriate receiving system, which according to one embodiment is the second system 204. According to one embodiment, this method of receiving, formatting, and transmitting the communication is a known standard protocol known as a TCP/IP protocol. Alternatively, the method is any known method for receiving, formatting, and transmitting an electronic communication to another database system. According to one alternative embodiment, the node dispatcher 230 also encrypts the communication prior to transmission to the receiving system. The encryption can occur by any known method.

The trigger mechanism 220 is in communication with the dispatcher 222, which in turn is in communication with the trigger listener 226, which is in communication with the communication manager 228. The format translator 231 is in communication with the format dictionary 229. The node dispatcher 230 and the node listener 232 are both in communication with the communication manager 228, and all three are in communication with the network 260. The first system 202 can be any known database management system. Further, the first system according to one embodiment is any database system allowing for active updating to the database 219.

The trigger listener 226, communication manager 228, node dispatcher 230, and node listener 232 of the first system are software that may be developed using any computer programming language such as JAVA, C, C++, Cobol, Delphi, or any other known programming language.

The second system 204 has a second database 239 and a sync server 244. The second database 239 includes an trigger mechanism 240 and a dispatcher 242. The sync server 244 has a trigger listener 249, a communication manager 248, a node dispatcher 250, and a node listener 246. The communication manager 248 has a format dictionary 253 and a format translator 251. The trigger mechanism 240 is in communication with the dispatcher 242, which in turn is in communication with the trigger listener 249, which is in communication with the communication manager 248. The format translator 251 is in communication with the format dictionary 253. The node dispatcher 250 and the node listener 246 are both in communication with the communication manager 248, and all three are in communication with the network 260. The second system 204 can be any known database management system.

Unless otherwise indicated, the components of the second system 204 are configured and operate in the same fashion as the equivalent components of the first system 202. The trigger listener 249, communication manager 248, node dispatcher 250, and node listener 246 may be developed using any computer programming language such as JAVA, C, C++, Cobol, Delphi, or any other known programming language.

The identification system 206, according to one embodiment, is configured to control or assist with the unique identification of the database systems on the network of the present invention. The system 206 has an identification application 205 and an identification database 207. The application 205 is in communication with the database 207. The database 207 is a database or file configured in any known fashion to store data or information. The application 204, according to one embodiment, is a software application configured to transmit, by any known means, software to any database system on the network of the present invention, wherein the software, according to one exemplary embodiment, is identification software as described above. In a further alternative, the identification system 206 is configured to receive and write to the database 207 information from any database system on the network. According to one exemplary embodiment, the information relates to the identification status of the database system, including confirmation that the database system has received the identification software, has implemented the software into the system, and has begun writing the system's designated unique ID into its records, as described above as part of the designation process. In a further alternative embodiment, the information received at the identification system 206 is system administrator information as described above. According to one embodiment, the information stored at the identification database 207 can be retrieved by any known method by the identification application 205 in order to identify database systems on the network of the present invention, to identify an administrator or administrators associated with a particular system, or for any other purpose. Alternatively, the present invention has no identification system.

The communication system of the present invention, according to one embodiment, can be operated with the Informix system owned by IBM. Alternatively, the communication system is operated with any of the following databases: DB2, Oracle, Sybase, or Microsoft SQL. In a further alternative, the communication system can be operated with any known database.

Figure 8:
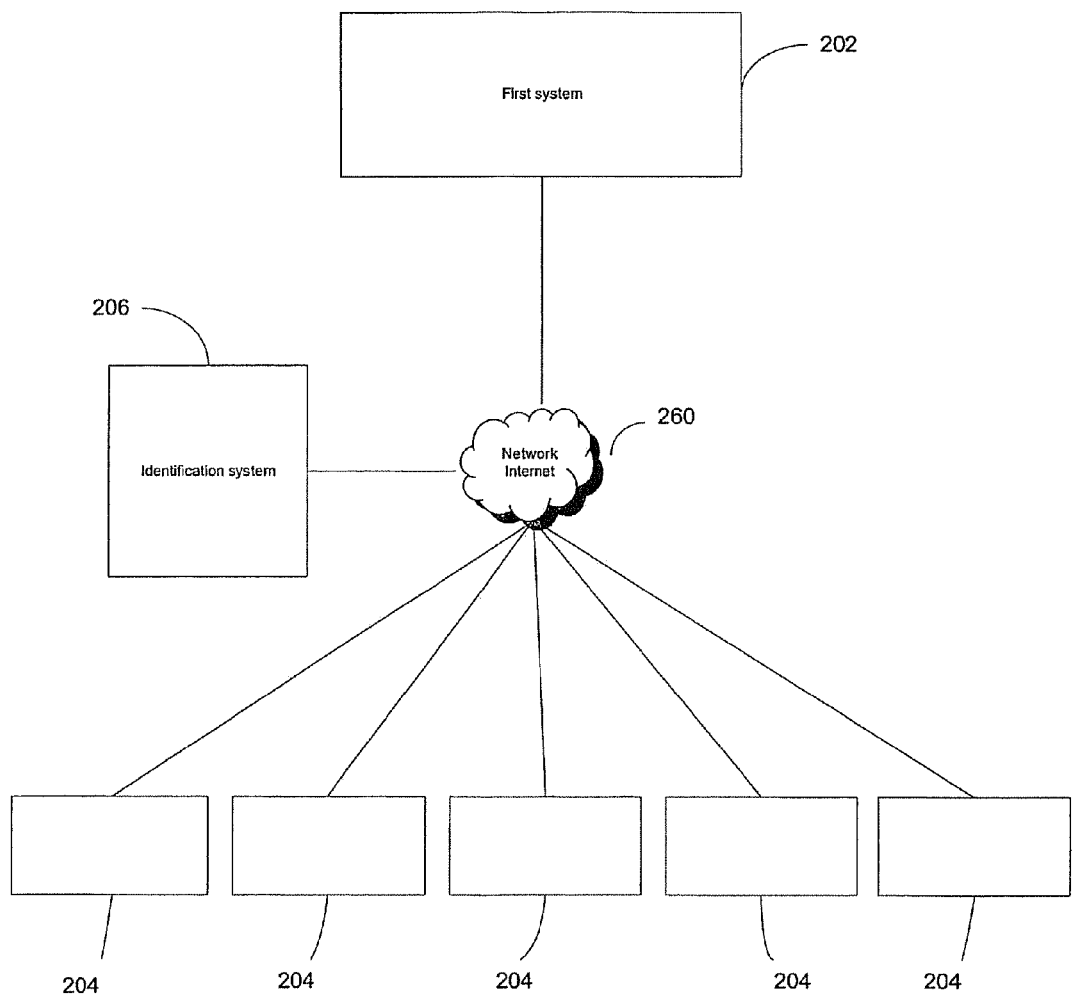
FIG. 8 is a schematic diagram illustrating the architecture of a network-based communication system according to an alternative embodiment of the present invention.

An alternative embodiment of the architecture of a network-based communication system is depicted in FIG. 8. The system includes a first system 202 and an identification system 206, both in communication over a network 260 with a plurality of systems 204. According to one embodiment relating to the financial industry, the first system 202 is what is known in the art as a provider system, while each of the systems 204 is what is known in the art as a remote system. In the financial industry, a provider system typically is a financial institution that controls a set of accounts owned by a plurality of other financial institutions known as remotes. That is, each of the remote systems owns at least one account in the database at the provider system.

In a further alternative, each of a plurality systems 204, while acting as remote systems in relation to the provider system 202, can also act as a provider database system in communication with a plurality of additional remote systems (not shown). In yet a further alternative, any provider system may serve as a remote system for a plurality of other provider systems and any remote system may serve as a provider system for a plurality of other remote systems.

With the identification and communication software in place, and communications established between two database systems, communication between the database systems, and seamless, real-time sharing of data between the databases of those systems, is now possible. According to one embodiment, accounts are set up at a first database by each database that wants to transact business with the first database. For example, the plurality of database systems 204 of FIG. 8 can each establish accounts at the first database 202. In a further example relating to the financial industry, the first database 202 is a provider database system and the plurality of database systems 204 are remote systems, and each remote system 204 has an account created at the provider system 202.

Figure 9:
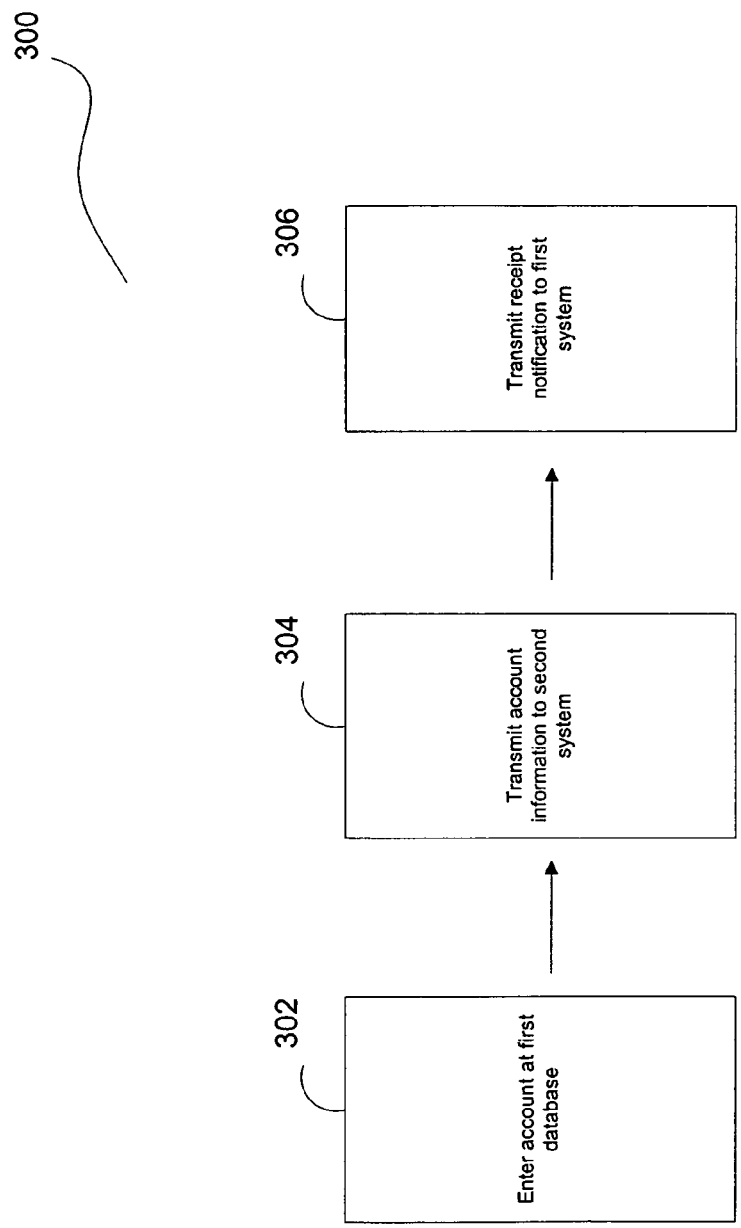
FIG. 9 is a flowchart showing the creation of an account within a network-based communication system, according to one embodiment of the present invention.

FIG. 9 shows the entering or creation of accounts for use with the network-based communication system 300, according to one embodiment of the present invention. Each account is created or entered at the first database such as the first database 219 as shown in FIG. 7 (block 302). According to one embodiment, the account is manually created by a user at an interface at the first system. Alternatively, the account is created or entered by any known method. Upon entering the account into the first database 219, the account information is automatically transmitted to the second system 204 (block 304). Once the account information is received at the second database 239, a receipt notification is transmitted back to the first system 202 (block 306).

Figure 10:
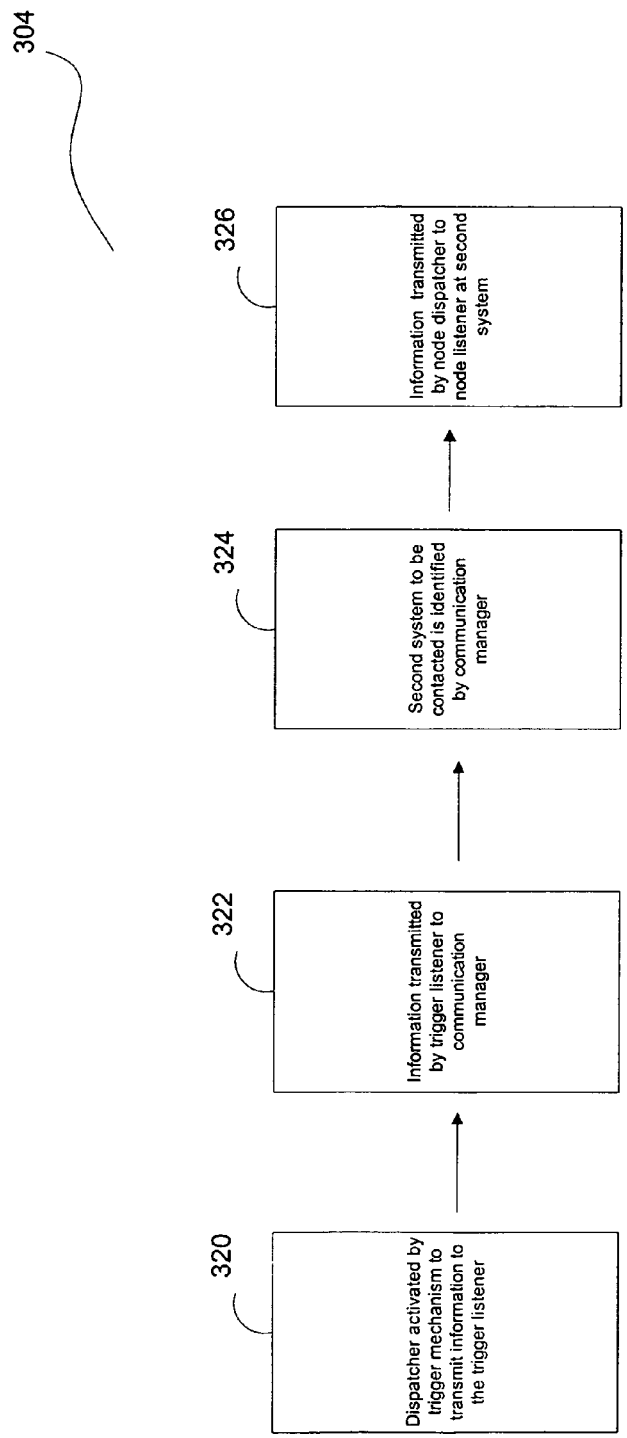
FIG. 10 is a flowchart illustrating the automatic transmission of account information to the second database, according to one embodiment of the present invention.

The automatic transmission of account information to the second database 239 (304), according to one embodiment, is depicted in FIG. 10. Upon creation or entering of the account as described above at the first database 219, the trigger mechanism 220 is configured to actuate the dispatcher 222 (block 320). That is, the trigger mechanism 220 transmits an electronic signal to the dispatcher 222, which in turn transmits a signal to the trigger listener 226 at the sync server 224. The trigger mechanism 220 and dispatcher 222 according to one embodiment are configured to operate in the same fashion as any known trigger and dispatcher components. The signal transmitted to the trigger listener 226, according to one embodiment, identifies the location of the information that was written to the database. For example, the signal according to one embodiment simply identifies the newly created account. Upon receiving the signal, the trigger listener 226 uses the location information regarding the newly created account to retrieve the appropriate information from the database about the newly created account and transmits the information in the form of an electronic signal to the communication manager 228 (block 322). According to one embodiment, the account information is retrieved by the listener 226 in a known fashion for reading data in a database and transmitting that data outside the database. For example, the listener 226 according to one exemplary embodiment retrieves the account information by issuing a read instruction to the database in the same fashion as any application retrieves information from a database. Alternatively, the communication manager 228 retrieves the account information by a known method for reading data in a database and retrieving the data after the trigger listener 226 provides the location information to the manager 228.

The communication manager 228 receives the electronic transmission from the trigger listener 226 and identifies the second system 204 that must be contacted (block 324). That is, the communication manager 228 reads the transmission, which contains the account information. The account information includes information about any other system (other than the first system) that should receive communications regarding any changes or additions to the account, including the "address" or other information related to contacting the other systems, which in this example is the second system 204. For example, according to one embodiment, the information includes the host IP address of the second system. Thus, the communication manager 228 identifies the address of the system(s) to which the account information is to be sent. The communication manager transmits the communication, including, in this case, the IP address of the second system, to the node dispatcher 230. Prompted by the communication manager 228, the node dispatcher 230 transmits the account information to the node listener 246 at the second system 204 (block 326). That is, the dispatcher 230 utilizes the IP address provided by the communication manager 228 to transmit the account information to the second system 204. Alternatively, the dispatcher 222 can transmit the information out of the first database 219 to be processed by any known method that allows the information to be transmitted to the second system 204.

Figure 11:
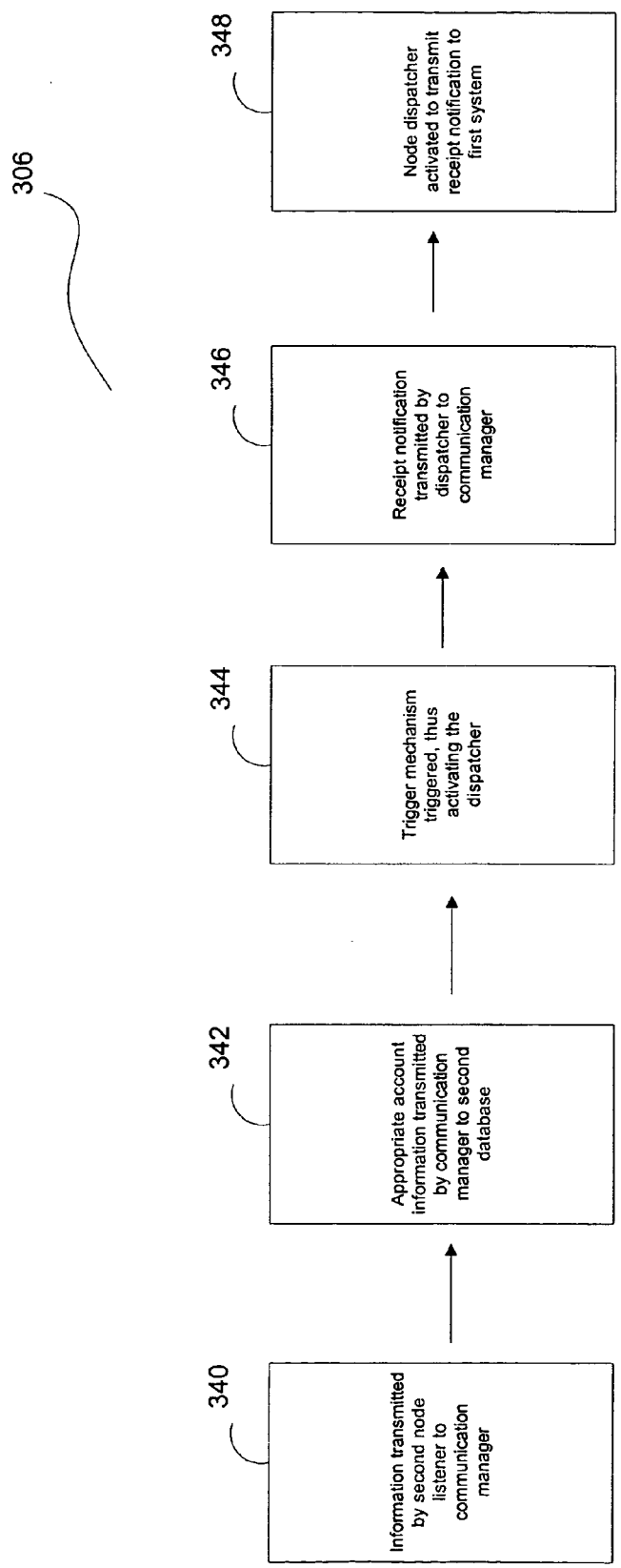
FIG. 11 is a flowchart depicting the receipt of account information at the second database and automatic transmission of a receipt notification to the first database, according to one embodiment of the present invention.

According to one embodiment, the receipt of the account information at the second database 239 and automatic transmission of a receipt notification to the first system 202 (306) is depicted in FIG. 11. Upon receipt of the account information, the second node listener 246 will transmit the information to the communication manager 248 (block 340). That is, the node listener performs its filtering and security functions, validates the communication, and then transmits the electronic message containing the account information to the communication manager. The communication manager transmits the appropriate account information to the second database 239 (block 342). That is, the communication manager reads the account information and writes the information to the database 239. Alternatively, the information can be received at the sync server 244 and processed by any known method that allows the account information to be received and transmitted to the second database 239.

When the account information is received at the second database 239, the trigger mechanism 240 is triggered, which actuates the dispatcher 242 (block 344). The trigger mechanism 240 and the dispatcher 242 operate in a fashion similar to that described for the first system 202 above. The dispatcher 242 transmits a receipt notification to the trigger listener 249. The receipt notification is an electronic communication containing information relating to the receipt of the account information at the second database 239. That is, the receipt notification is a communication to be sent back to the first system 202 confirming receipt of the account information. The trigger listener 249 which transmits the notification to the communication manager 248 (block 346), which actuates the node dispatcher 250 to transmit the notification to the first system 202 (block 348). These steps occur in the generally the same fashion as the steps relating to the transmission of the account information at the first system 202. Alternatively, the dispatcher 242 can transmit the receipt notification out of the second database 239 to be processed by any known method that allows the receipt notification to be transmitted to the first system 202.

According to one embodiment, the creation of an account at the second system, automatic transmission of the newly-created account information to the first system, the receipt of the account information at the first system, and the automatic transmission of a receipt notification to the second system occur in the same way as the creation of an account at the first system and the subsequent processes as described above.

Once an account has been created at one system and the information is shared with the appropriate second system(s), the operation of the communication system of the present invention can begin. That is, maintenance of existing accounts, including changes or additions (which can also be referred to as "transactions") can occur at the account, and creation of further accounts can occur, and that information can be shared between database systems.

Figure 12:
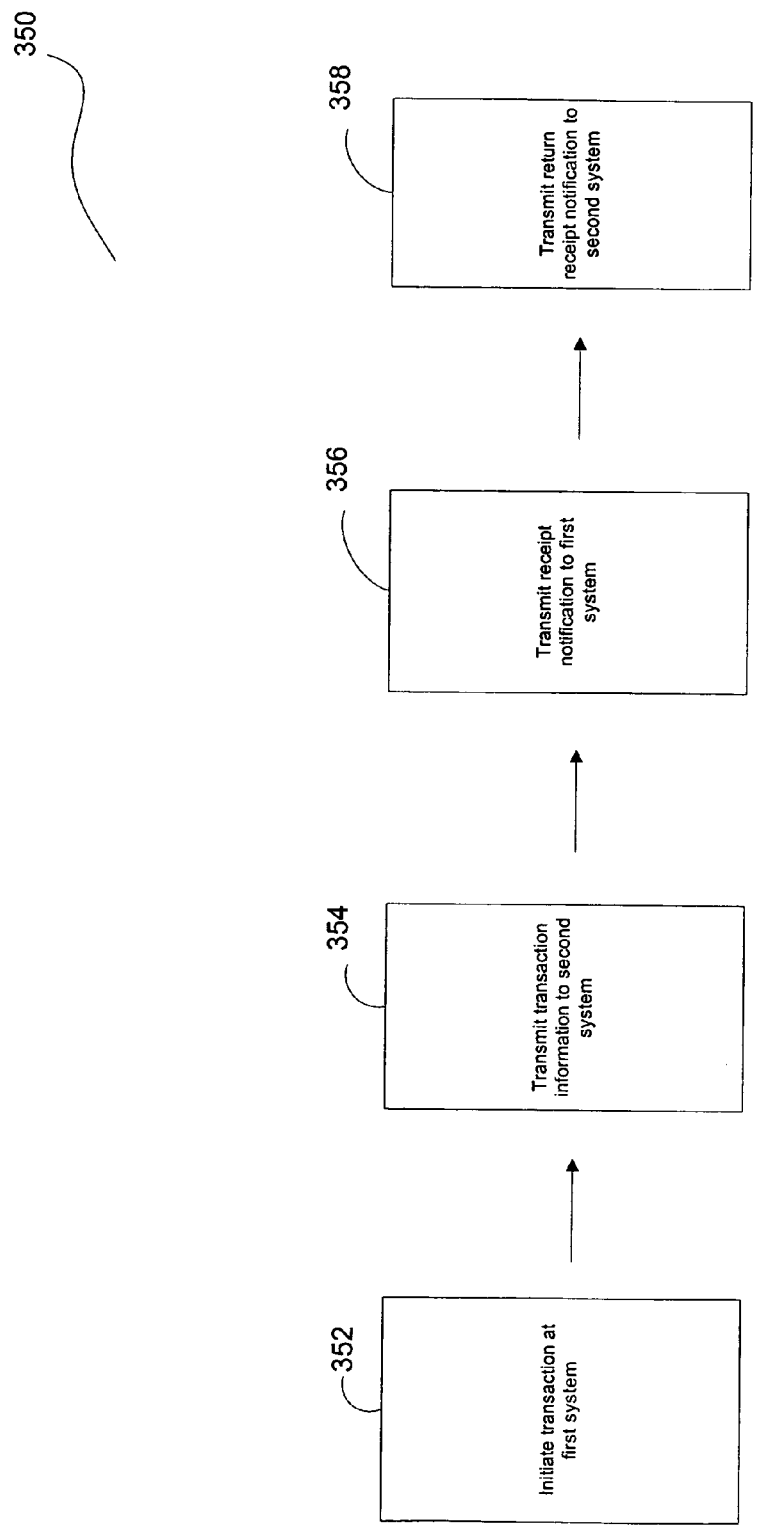
FIG. 12 is a flowchart showing the operation of a network-based communication system, according to one embodiment of the present invention.

An overview of the operation of the network-based communication system 350 according to one embodiment of the present invention is depicted in FIG. 12. A transaction related to an account is initiated at the first system 202 (block 352). For purposes of this application, "transaction" includes, but is not limited to, any activity at a database, such as writing, removing, erasing, or changing a record at the database. According to one embodiment, the initiation of a transaction consists of writing data related to a change or addition in the account into the first database 219 at the first system 202. For purposes of this application, the word "write" or any related form of the word "write" shall be used to describe the act of writing, persisting, or any other word for describing the change or addition of data to a database in any way. Once the account is changed at the first database 219, information relating to the transaction is automatically transmitted to the second system 204 (block 354). For purposes of this application, any electronic transmission of information can be referred to as a "communication." Upon receipt of the transaction information at the second database 239, the second system 204 automatically transmits a receipt notification to the first system 202, confirming receipt of the information (block 356). Upon receipt at the first system 202 of the receipt notification, the first system 202, according to an alternative embodiment, automatically transmits to the second system 204 a return receipt notification, confirming receipt of the receipt notification (block 358).

Figure 13:
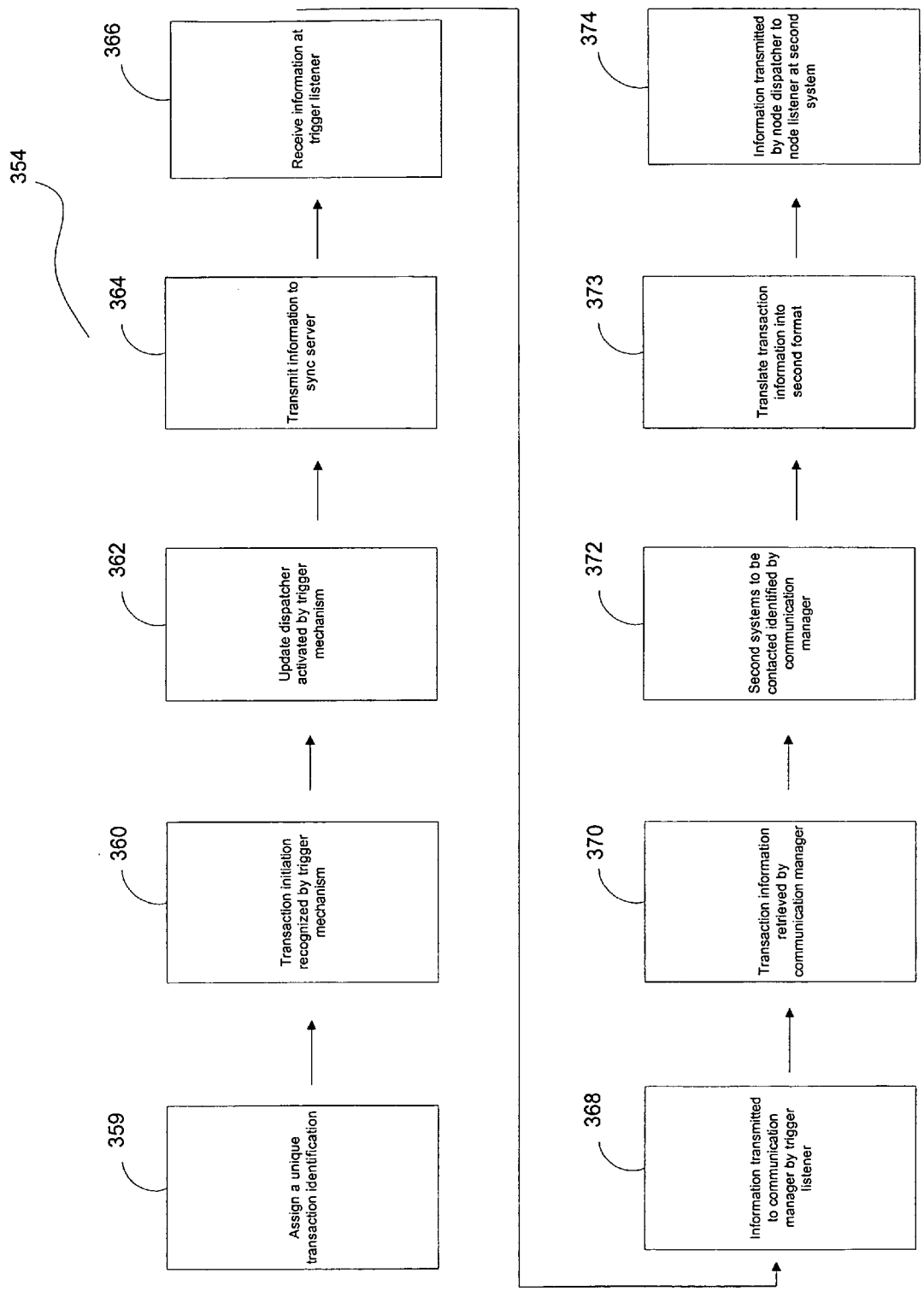
FIG. 13 is a flowchart illustrating the automatic transmission of information related to an initiated transaction, according to one embodiment of the present invention.

According to one embodiment, the automatic transmission of information related to a transaction 354 is depicted in FIG. 13. Upon changing or adding information to an account, a unique transaction identification is assigned by the first database 219 to that transaction (block 359). That is, according to one embodiment, the unique ID related to the first database 219 is added as a field in the new record created as a result of the transaction at the first database 219. According to one embodiment, the identification software of the present invention at the first database system 202 creates the unique transaction identification. Alternatively, the unique transaction identification is created in any known fashion at another server, such as the identification system, in the first database, or in the hardware of the first system. In a further alternative, the unique transaction identification is created by any known means for assigning identification to a database record. In yet a further alternative, the unique transaction ID is created as part of the transaction.

FIG. 13A is a screen shot depicting an exemplary set of records relating to transactions at a database, according to one embodiment of the present invention. For example, the records may relate to transactions initiated at the first system. The records each have a field containing the unique ID associated with the first system 361. Further, each record has a standard record ID 363. In addition, each record includes a field (not shown) identifying the database system that "owns" or is associated with the record. Alternatively, each record is associated with the appropriate database system in any known fashion.

Referring again to FIG. 13, the change or addition of information at the first database 219 is recognized by the trigger mechanism 220 (block 360). The trigger mechanism 220 actuates the dispatcher 222 (block 362), which transmits an electronic communication to the sync server 224 (block 364). That is, the trigger mechanism 220 transmits an electronic communication to the dispatcher 222, which in turn transmits a communication to the trigger listener 226 at the sync server 224. The communication transmitted to the trigger listener 226, according to one embodiment, identifies the location of the transaction information that was written to the database. For example, the communication according to one embodiment simply identifies the record containing the transaction information.

At the sync server 224, the communication is received by the trigger listener 226 (block 366). Upon receiving the communication, the trigger listener 226 uses the record information to retrieve the appropriate transaction information from the record in the database and transmits the information in the form of an electronic communication to the communication manager 228 (block 368). According to one embodiment, the transaction information is retrieved by the listener 226 in a known fashion for reading data in a database and transmitting that data outside the database. For example, the listener 226 according to one exemplary embodiment retrieves the transaction information by issuing a read instruction to the database in the same fashion as any application retrieves information from a database. Alternatively, the communication manager 228 retrieves the record information by a known method for reading data in a database and retrieving the data after the trigger listener 226 provides the location information to the manager 228.

The communication manager 228 receives or retrieves the transaction information from the trigger listener 226 (block 370) as described above and identifies the second system 204 that must be contacted (block 372). That is, the communication manager 228 reads the communication, which contains the transaction information. The transaction information includes information about any other system (other than the first system) that should receive communications regarding any changes or additions to the account, including the "address" or other information related to contacting the other system(s), which in this example is the second system 204. For example, according to one embodiment, the information includes the host IP address of the second system. Thus, the communication manager 228 identifies the address of the system(s) to which the account information is to be sent.

Upon identification of the second system, the transaction information is translated into a format compatible with the second system (block 373). According to one embodiment, translation includes identifying the format of the identified second system using the format dictionary 229 and translating at the format translator 231 the transaction information into that format. According to one embodiment, the translation process can occur by any known method of converting an electronic communication into a format compatible with the receiving system. For example, the translation process can occur by the same method used by messaging systems.

The communication manager 228 transmits the communication, including, in this case, the IP address of the second system 204, to the node dispatcher 230. Prompted by the communication manager 228, the node dispatcher 230 transmits the transaction information to the node listener 246 at the second system 204 (block 374). That is, the dispatcher 230 utilizes the IP address provided by the communication manager 228 to transmit the transaction information to the second system 204. Alternatively, the dispatcher 222 can transmit the information out of the first database 219 to be processed by any known method that allows the information to be transmitted to the second system 204.

Figure 14:
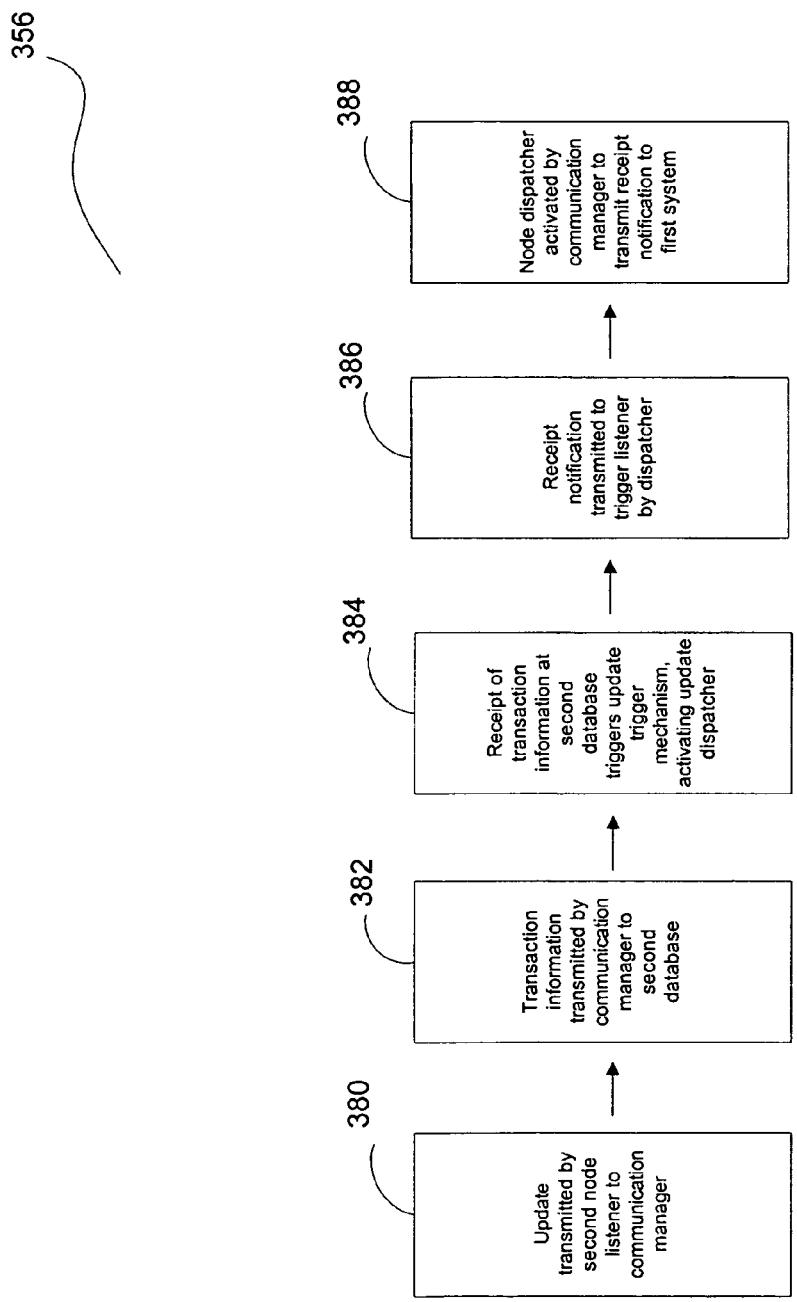
FIG. 14 is a flowchart depicting the receipt of transaction information at the second system and automatic transmission of a receipt notification to the first system, according to one embodiment of the present invention.

According to one embodiment, the receipt of the transaction information at the second database 239 and automatic transmission of a receipt notification to the first system 202 (356) is depicted in FIG. 14. Upon receipt of the transaction information, the second node listener 246 will transmit the information to the communication manager 248 (block 380). That is, the node listener 246 performs its filtering and security functions, validates the communication, and then transmits the electronic communication containing the transaction information to the communication manager 248. The communication manager 248 transmits the appropriate transaction information to the second database 239 (block 382). That is, the communication manager 248 reads the account information and writes the information to the database 239. Alternatively, the information can be received at the sync server 244 and processed by any known method that allows the information to be received and transmitted to the second database 239.

When the transaction information is received at the second database 239, the trigger mechanism 240 is triggered, which actuates the dispatcher 242 (block 384). The trigger mechanism 240 and the dispatcher 242 operate in a fashion similar to that described for the first system 202 above. The dispatcher 242 transmits a receipt notification to the trigger listener 249 (block 386). The receipt notification is an electronic communication containing information relating to the receipt of the transaction information at the second database 239. That is, the receipt notification is a communication to be sent back to the first system 202 confirming receipt of the account information. According to one embodiment, the receipt notification includes information indicating the date and time when the transaction information was received at the second database 239 (also referred to as a "time stamp").

The trigger listener 249 transmits the notification to the communication manager 248, which actuates the node dispatcher 250 to transmit the notification to the first system 202 (block 388). These steps occur in the generally the same fashion as the steps relating to the transmission of the transaction information at the first system 202. Alternatively, the dispatcher 242 can transmit the receipt notification out of the second database 239 to be processed by any known method that allows the receipt notification to be transmitted to the first system 202.

Transactions can also be initiated at the second system, according to one embodiment of the present invention. Typically, the process for transaction initiation and the subsequent steps of automatic transmission of the transaction information to the first database system and the transmission of the return receipt notification back to the second database system occur in the same manner as described above for transactions initiated at the first system.

According to an alternative embodiment, the present invention can be configured to allow for monitoring communication failures and notifying the appropriate administrators of such failures. Thus, if an entire database system or a database at a database system on the network is malfunctioning or has "crashed," the system of the present invention can track the communications that do not reach their intended destinations as a result of that malfunction and notify the appropriate administrators of the malfunction. According to one embodiment, the database system in communication with the malfunctioning system track the communication failures and transmits the appropriate notifications.

Figure 15:
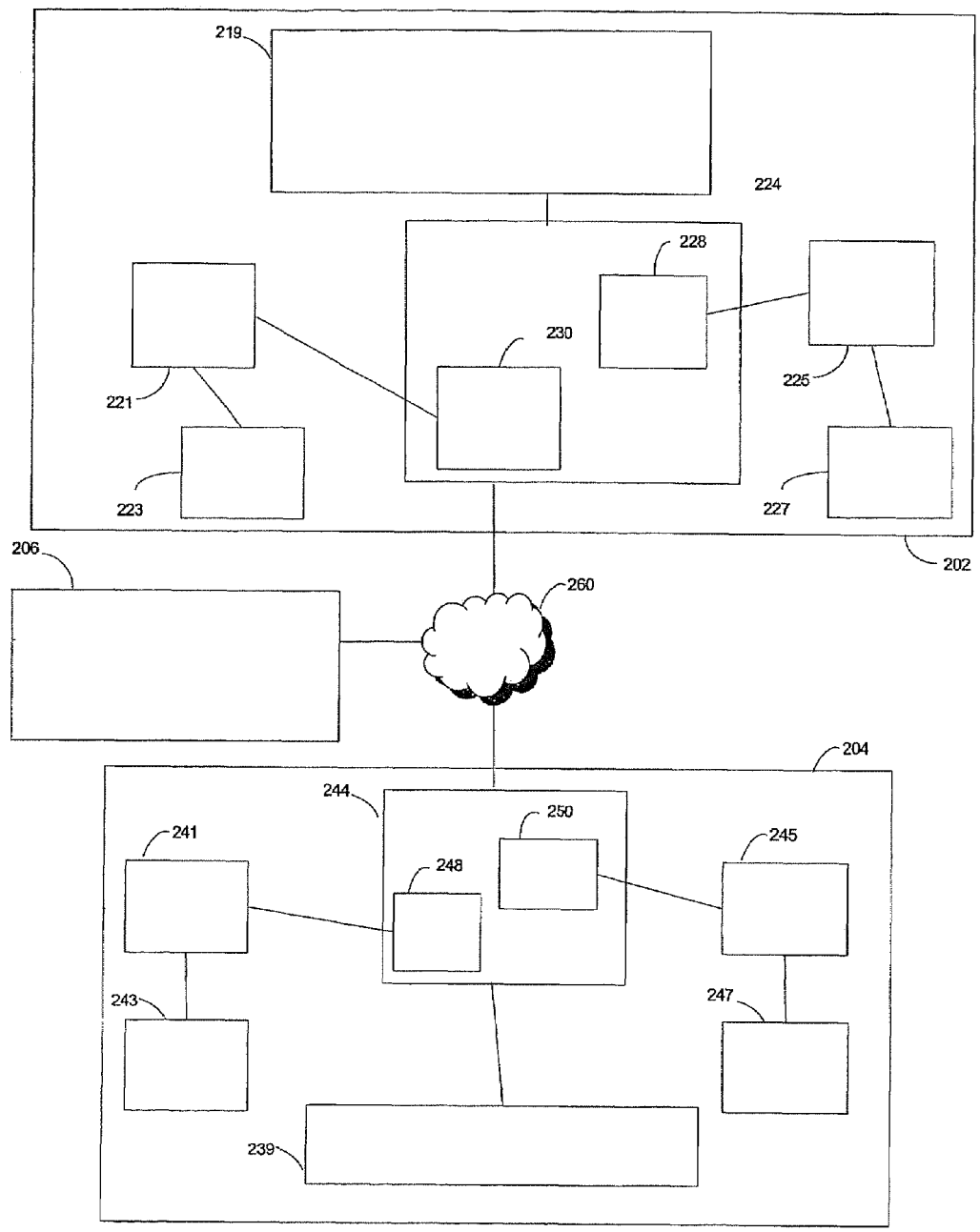
FIG. 15 is a schematic diagram illustrating the architecture of a network-based communication system, according to a further alternative embodiment of the present invention.

An embodiment of the architecture of a network-based communication system configured to track communication failures is depicted in FIG. 15. The system includes a first database system 202, a second database system 204, and an identification system 206, all of which are in communication with each other over a network 260. Alternatively, the system does not have an identification system. The first system 202 has a database 219, a sync server 224, an unsuccessful transmission log file 221, an unsuccessful transmission log tracker 223, an unsuccessful application log file 225, and an unsuccessful application log tracker 227.

The unsuccessful transmission log file 221 is a file or database that is configured to receive and store any communications or messages created by the communication manager 228 that fail to be successfully transmitted to the second database system or the expected receiving database system. According to one embodiment, the communication records are stored in any format chosen by the system. For example, the communication records can be stored in XML format, SQL format, or any other known format. The log file 221 can be any known database configured to store such information.

The unsuccessful transmission log tracker 223 is an application configured to monitor the unsuccessful transmission log file 221 for unsuccessful transmission records. That is, the tracker 223 is configured to read the file 221 to determine if any unsuccessful transmissions have be placed in the file 221. In one aspect of the present invention, the log tracker 223 can be placed on any server with access to the first database 219. According to one embodiment, the log tracker 223 is an application created with JAVA code. Alternatively, the unsuccessful transmission log tracker 223 can be written in any programming language.

The unsuccessful application log file 225 is a file or database that is configured to receive and store any communications or messages received from another database system that cannot be applied to the first database 219. According to one embodiment, the communication is stored in the same format as it was received from the other database system. In one aspect of the invention, the information stored at the log file 225 includes the time of the attempted application and the type of error, if known. The error could be related to an invalid record, an invalid file type, or any other known database error. According to one embodiment, the log file 225 can be any known database configured to store such information.

The unsuccessful application log tracker 227 is an application configured to monitor the unsuccessful application log file 225 for unsuccessful application records. That is the tracker 227 is configured to read the file 225 to determine if any unsuccessful applications have be placed in the file 225. According to one embodiment, the log tracker 227 is an application created with JAVA code. Alternatively, the unsuccessful application log tracker 227 can be written in any programming language.

The unsuccessful transmission log file 221 is in communication with both the node dispatcher 230 in the sync server 224 and the unsuccessful transmission log tracker 223. The unsuccessful application log file 225 is in communication with the both the communication manager 228 in the sync server 224 and the unsuccessful application log tracker 227.

The second system 204 has a database 239, a sync server 244, an unsuccessful application log file 241, an unsuccessful application log tracker 243, an unsuccessful transmission log file 245, and an unsuccessful transmission log tracker 247. Each of the components are configured in a fashion similar to the equivalent components in the first system 202. The unsuccessful transmission log file 245 is in communication with the both the node dispatcher 250 in the sync server 244 and the unsuccessful transmission log tracker 247. The unsuccessful application log file 241 is in communication with the both the communication manager 248 in the sync server 244 and the unsuccessful application log tracker 243. Alternatively, unsuccessful transmissions and applications can be tracked using a log file and log tracker that are maintained in server memory. In a further alternative, unsuccessful transmissions and applications can be tracked using error flags attached to database records. In yet another alternative, the unsuccessful transmissions and applications can be captured on a real-time basis, rather than storing them in a file.

Figure 16:
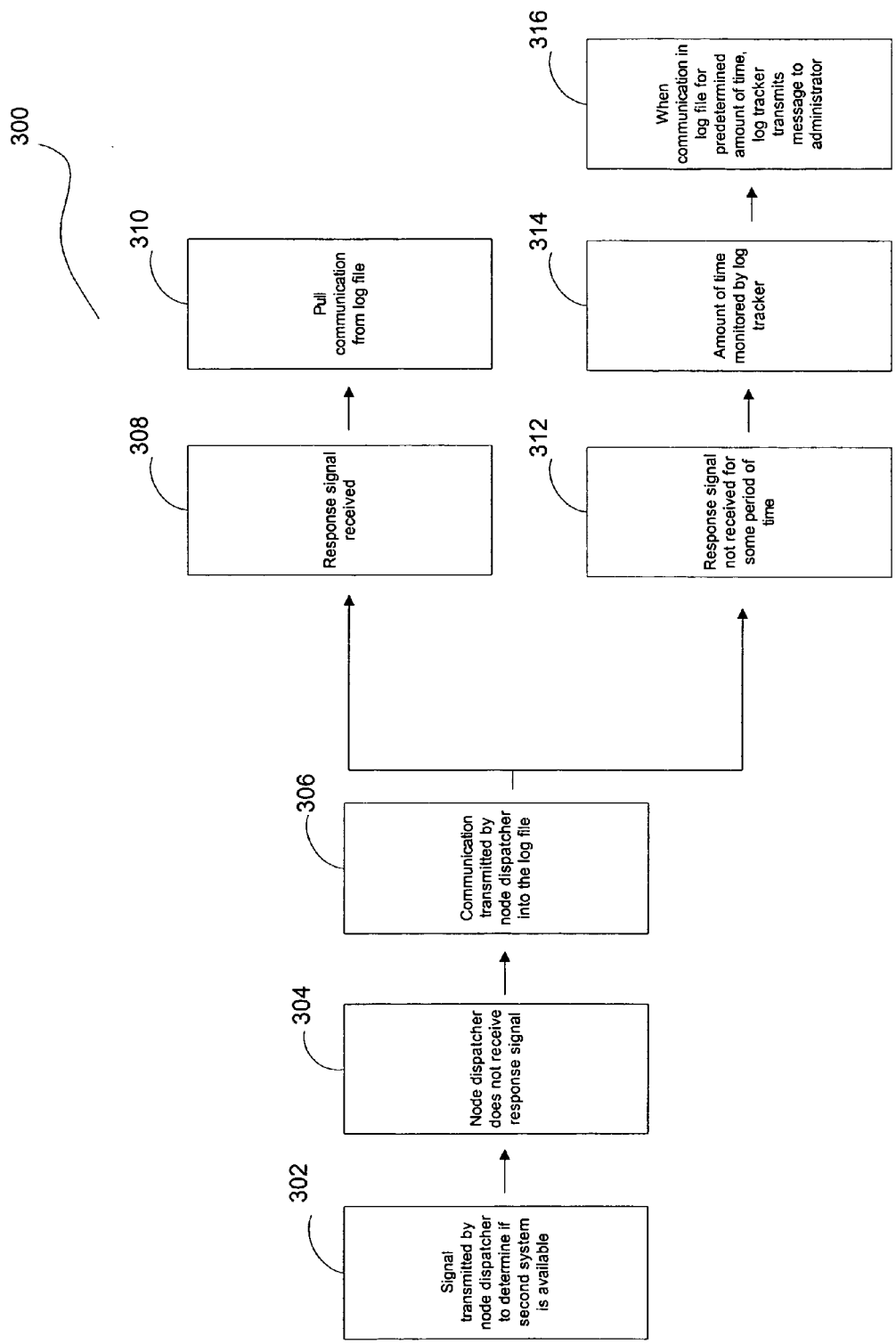
FIG. 16 is a flowchart depicting a method of tracking at the first system information that is not successfully transmitted to the second system, according to one embodiment of the present invention.

FIG. 16 depicts a method of tracking, at the first system, electronic communications that are not successfully transmitted to the second system 204 (300), according to one embodiment of the present invention. During normal operation, the node dispatcher 230, prior to actually transmitting a communication to a particular second system 204, transmits a signal to determine if the particular second system 204 is available (block 302). Alternatively, the unsuccessful transmission log tracker 223 transmits the signal. According to one embodiment, the signal is a known communication that is transmitted over a network to the appropriate IP address of the intended receiving system. The signal, according to one embodiment, is called a "ping." The communication, according to one embodiment, consists of four known "packet messages" that are transmitted. The dispatcher, according to one embodiment, is configured to track whether the system at the IP address responds to the signal, which in one embodiment, is four packet messages. Alternatively, if the tracker 223 transmits the signal, the tracker can track whether the system responds. According to one embodiment, the dispatcher tracks the packet messages that are received and responded to by the recipient system. According to one embodiment, if there is a failure, i.e., one or more of the packet messages is not responded to, a communication providing the results of the signal is transmitted by an application at the second system to the first system 202.

If the node dispatcher 230 does not receive a response signal (block 304), the node dispatcher 230 transmits the communication to the unsuccessful transmission log file 221 at the first system 202 (block 306). That is, instead of transmitting the transaction information to the second system 204, the node dispatcher transmits it to the unsuccessful transmission log file 221. According to one embodiment, the information transmitted to the log file 221 includes the time of the attempted transmission.

According to one embodiment, the unsuccessful transmission log tracker 223 will continue to transmit a signal to the second system (or "ping" the second system) until it gets a positive response as described above to the communication from the second system. If a response signal is subsequently received from the second system 204 (block 308), the previously unsuccessfully transmitted information will be transmitted to the second system (block 310). According to one aspect of the present invention, the communication is pulled from the unsuccessful transmission log file 221 and transmitted to the second system 204. That is, the tracker 223 reads the communication at the log file 221 by the known process of reading a record in any database and transmits the record to the second system. According to one embodiment, the communication is transmitted directly from the unsuccessful transmission log tracker 223. Alternatively, the transaction information can be transmitted by the node dispatcher 230. According to one embodiment, if the transmission by the tracker 223 is successful, the tracker 223 will delete the communication from the log file 221 by any known deletion or removal method.

In instances where the response signal is not received for some period of time (block 312), an unsuccessful transmission log tracker 223 monitors the amount of time that the communication remains in the unsuccessful transmission log file 221 (block 314). According to one embodiment, the tracker 223 is configured to "wake up" or operate at predetermined intervals and read every record present in the log file 221. This type of predetermined activity by an application is a known method often used by JAVA applications known as "daemon" applications. Upon reading the records in the log file 221, the tracker 223 will attempt to transmit a signal or "ping" to the intended recipient system of each record, which in this example is the second system. If there is no response from the second system, the tracker 223 is configured to calculate the amount of time that the unsuccessful communication has been stored in the log file 221 using the time of the first transmission attempt, which is included in the transaction information stored at the log file 221 according to one embodiment.

When the communication has remained in the unsuccessful transmission log file 221 for a predetermined amount of time, the unsuccessful transmission log tracker 223 transmits a message to the first system administrator, notifying the administrator of the failure (block 316). Alternatively, the unsuccessful transmission log tracker 223 transmits a message to the first and second system administrators. The message, according to one embodiment, is an e-mail message. Alternatively, the message is a task message, wherein a flashing symbol is posted to the system administrator's monitor screen and when the administrator clicks on the flashing symbol, the message is delivered on the screen. In a further alternative, the message is sent via telecommunication. The message may be in any known communication form. In a further alternative, the message can be sent immediately upon unsuccessful transmission. According to one embodiment, the message may include information relating to the unsuccessful transmission, including the contents of the communication itself, the time of the unsuccessfully transmission attempt, and the intended recipient database system.

Figure 17:
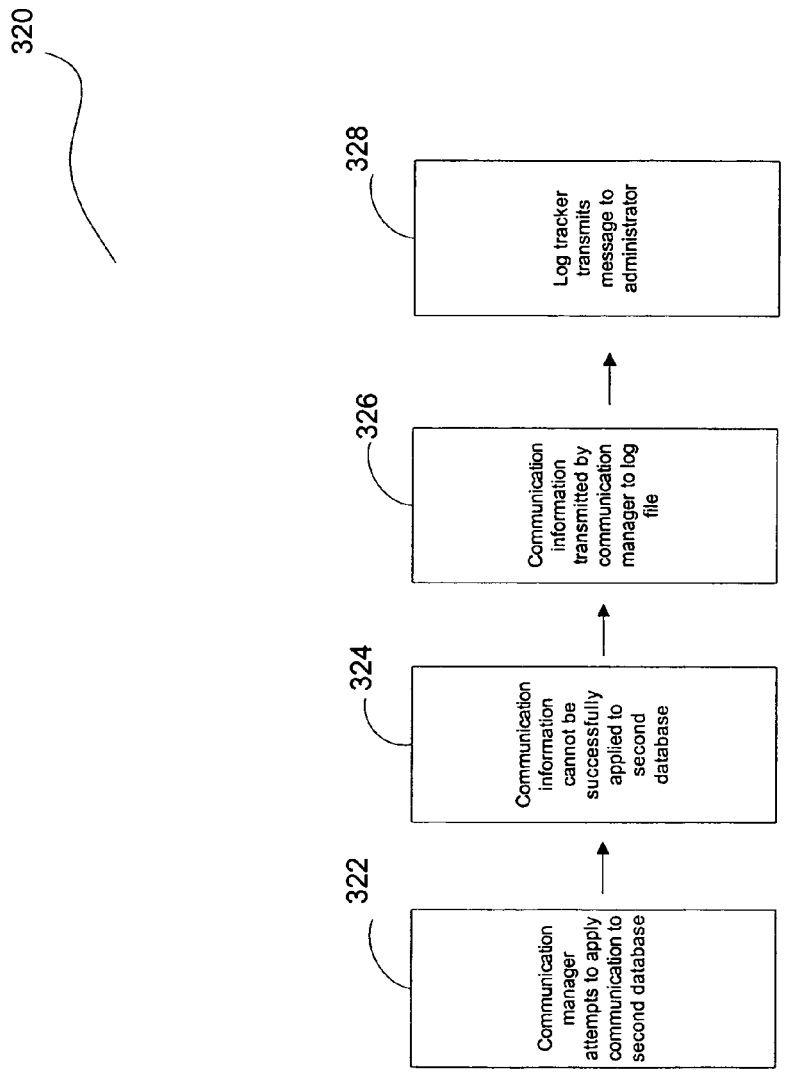
FIG. 17 is a flowchart depicting a method of tracking at the second system information that is not successfully applied to the second database, according to one embodiment of the present invention.

FIG. 17 depicts a method of tracking, at the second system, communications that are not successfully applied to the second database 239 (320), according to one embodiment of the present invention. During normal operation, upon receipt of a communication from a first system, the communication manager 248 attempts to apply the communication to the second database 239 (block 322) as further described above with respect to the operation of the present invention. If the communication cannot be successfully applied to the second database 239 for any reason (block 324), the communication manager 248 transmits the information contained in the communication into the unsuccessful application log file 241 (block 326). According to one embodiment, the information transmitted to the log file 241 includes the time of the attempted application to the second database 239.

When the information has been transmitted to the unsuccessful application log file 241, the unsuccessful application log tracker 243 transmits a message to the second system administrator, notifying the administrator of the failure (block 328). According to one embodiment, the log tracker 243 is configured in a similar fashion to the unsuccessful transmission log tracker 223 of the first system 202 and "wakes up" or operates at predetermined intervals to read any record present in the log file 241. Upon reading a record in the log file, the tracker 243 transmits a message to the second system administrator. Alternatively, the unsuccessful application log tracker 243 transmits a message to both the first and second system administrators. The message, according to one embodiment, is an e-mail message. Alternatively, the message is a task message, wherein a flashing symbol is posted to the system administrator's monitor screen and when the administrator clicks on the flashing symbol, the message is delivered on the screen. In a further alternative, the message is sent via telecommunication. The message may be in any known communication form. According to one embodiment, the message may include information relating to the unsuccessful application, including the contents of the communication itself, the time of the unsuccessful application attempt, and the identification of the transmitting database system.

Figure 18:
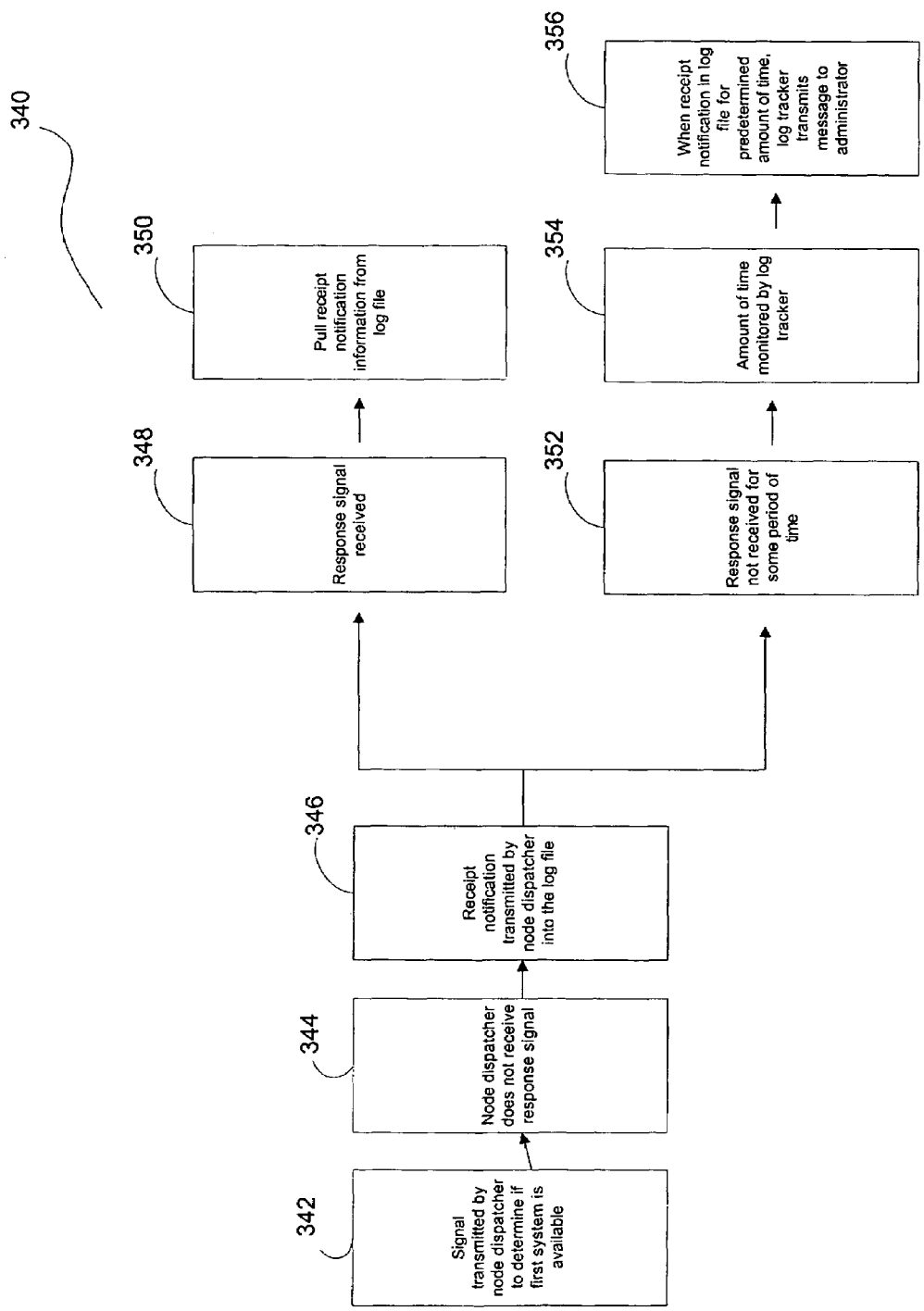
FIG. 18 is a flowchart showing a method of tracking at the second system receipt notifications that are not successfully transmitted to the first system, according to one embodiment of the present invention.

FIG. 18 depicts a method of tracking, at the second system, receipt notifications that are not successfully transmitted to the first system 202 (340), according to one embodiment of the present invention. The process is similar to the method of tracking, at the first system, electronic communications that are not successfully transmitted to the second system (300) as described above. During normal operation, the node dispatcher 250, prior to actually transmitting a receipt notification to the first system 202, transmits a signal to determine if the first system 202 is available (block 342). Alternatively, the unsuccessful transmission log tracker 247 transmits the signal. The signal, according to one embodiment, is similar to the signal transmitted by the first system as described above. The dispatcher 250, according to one embodiment, is configured to track whether the first system responds. Alternatively, if the tracker 247 transmits the signal, the tracker can track whether the first system responds.

If the node dispatcher 250 does not receive a response signal (block 344), the node dispatcher 250 transmits the receipt notification into the unsuccessful transmission log file 245 at the second system 204 (block 346). According to one embodiment, the information transmitted to the log file 245 includes the time of the attempted transmission.

According to one embodiment, the unsuccessful transmission log tracker 247 will continue to transmit a signal to the first system (or "ping" the second system) until it gets a positive response. If a response signal is subsequently received from the first system 202 (block 348), the previously unsuccessfully transmitted receipt notification will be pulled from the log file 245 and transmitted to the first system 202 (block 350). That is, the tracker 247 reads the communication at the log file 245 by the known process of reading a record in any database and transmits the receipt notification to the first system. According to one embodiment, the notification is transmitted directly from the unsuccessful transmission log tracker 247. Alternatively, the notification can be transmitted by the node dispatcher 250. According to one embodiment, if the transmission by the tracker 247 is successful, the tracker 247 will delete the notification from the log file 245 by any known deletion or removal method.

In instances where the response signal is not received for some period of time (block 352), the unsuccessful transmission log tracker 247 monitors the amount of time that the receipt notification remains in the unsuccessful transmission log file 245 (block 354). According to one embodiment, the tracker 247, like the tracker 223 at the first system 202, is configured to "wake up" or operate at predetermined intervals and read every record present in the log file 245. Upon reading the records in the log file 245, the tracker 247 will attempt to transmit a signal to the intended recipient system of each record, which in this example is the first system. If there is no response from the first system, the tracker 247 is configured to calculate the amount of time that the unsuccessful notification has been stored in the log file 245 using the time of the first transmission attempt, which is included in the notification information stored at the log file 245 according to one embodiment.

When the receipt notification has remained in the unsuccessful transmission log file 245 for a predetermined amount of time, the unsuccessful transmission log tracker 247 transmits a message to the second system administrator, notifying the administrator of the failure (block 356). Alternatively, the unsuccessful transmission log tracker 247 transmits a message to the first and second system administrators. The message, according to one embodiment, is an e-mail message. Alternatively, the message is a task message, wherein a flashing symbol is posted to the system administrator's monitor screen and when the administrator clicks on the flashing symbol, the message is delivered on the screen. In a further alternative, the message is sent via telecommunication. The message may be in any known communication form. In a further alternative, the message can be sent immediately upon unsuccessful transmission. According to one embodiment, the message may include information relating to the unsuccessful transmission, including the contents of the communication itself, the time of the unsuccessful transmission attempt, and the intended recipient database system.

Figure 19:
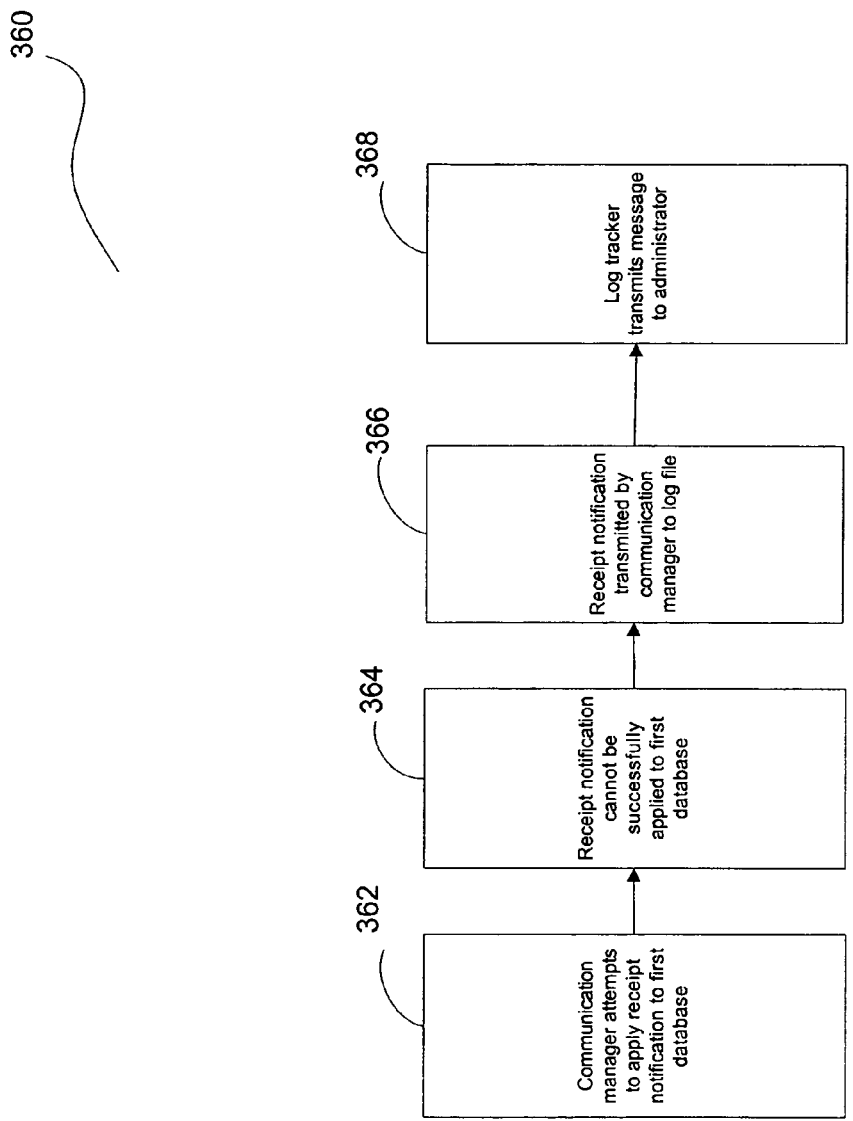
FIG. 19 is a flowchart illustrating a method of tracking at the first system receipt notifications that are not successfully applied to the first database, according to one embodiment of the present invention.

FIG. 19 depicts a method of tracking, at the first system, receipt notifications that are not successfully applied to the first database 219 (360), according to one embodiment of the present invention. During normal operation, upon receipt of a receipt notification from the second system, the communication manager 228 attempts to apply the receipt notification to the first database 219 (block 362) as further described above with respect to the operation of the present invention. If the receipt notification cannot be successfully applied to the first database 219 for any reason (block 364), the communication manager 228 transmits the receipt notification into the unsuccessful application log file 225 (block 366). According to one embodiment, the information transmitted to the log file 225 includes the time of the attempted application to the first database 219.

When the receipt notification has been transmitted to the unsuccessful application log file 225, the unsuccessful application log tracker 227 transmits a message to the first system administrator, notifying the administrator of the failure (block 368). According to one embodiment, the log tracker 227 is configured to "wake up" or operate at predetermined intervals to read any record present in the log file 225. Upon reading a record in the log file, the tracker 227 transmits a message to the first system administrator. Alternatively, the unsuccessful application log tracker 227 transmits a message to both the first and second system administrators. The message, according to one embodiment, is an e-mail message. Alternatively, the message is a task message, wherein a flashing symbol is posted to the system administrator's monitor screen and when the administrator clicks on the flashing symbol, the message is delivered on the screen. In a further alternative, the message is sent via telecommunication. The message may be in any known communication form. According to one embodiment, the message may include information relating to the unsuccessful application, including the contents of the communication itself, the time of the unsuccessful application attempt, and the identification of the transmitting database system.

According to one embodiment, the log files in the first and second systems can also track unsuccessful transmissions based on a transaction that begins at the second system. Typically, the process for tracking unsuccessful transmissions and applications of transmissions based on a transaction occurs in the same manner as described above for transactions initiated at the first system.

Figure 20:
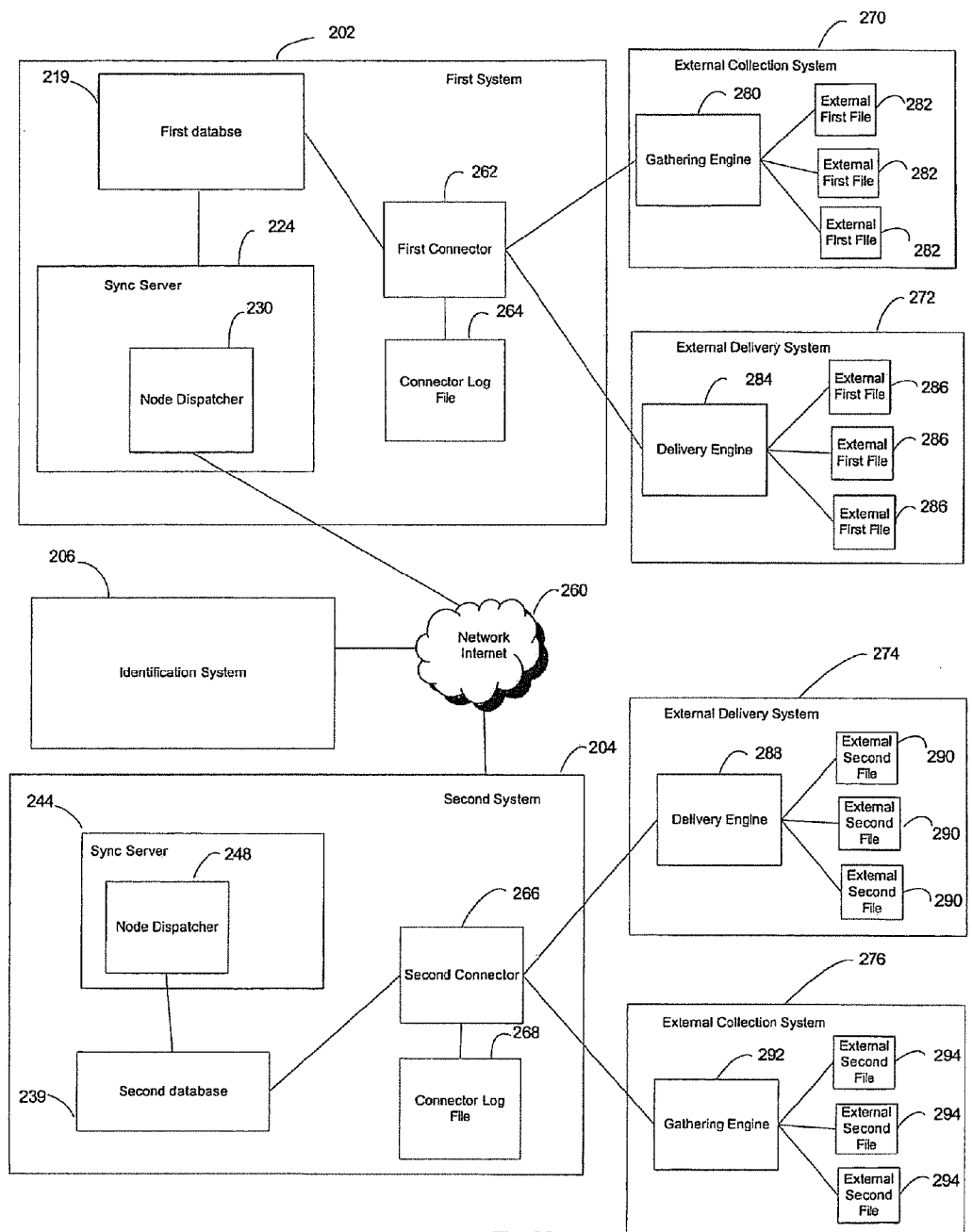
FIG. 20 is a schematic diagram illustrating the architecture of a network-based communication system, according to a further alternative embodiment of the present invention.

A further alternative embodiment of the architecture of a network-based communication system is depicted in FIG. 20. In this alternative embodiment, the system and method of the present invention provides for communication with external systems. This capability makes it possible to connect the system of the present invention with previously existing database and application systems. The system includes a first database system 202, a second database system 204, an identification system 206, an external first collection system 270, an external first delivery system 272, an external second delivery system 274, and an external second collection system 276.

For purposes of this application, "external system," "external database system," "external delivery system," and "external collection system" are intended to include, but are not limited to, any application, file, database, or system that is not connected directly to the network of the present invention or are in direct communication with only one database system on the network of the present invention.

Each of the first and second collection systems 270, 276 are applications configured to collect information from external systems. According to one embodiment, the collection systems 270, 276 are specially-created applications developed as custom applications tailored to the unique configuration needs of a particular external system. For example, the collection systems 270, 276 are specially-tailored applications configured to move data from the existing systems to the newly formed database system. According to one embodiment, the applications are software packages developed to understand the data to be collected and provide a method of collecting the data, editing the data, and writing the data into the database system so that it is correct and follows data standards.

Alternatively, the collection systems 270, 276 are known applications used to integrate information contained in an old legacy system into a new system, the applications being configured to gather information from existing systems and populate a new file structure or database. For example, the collection systems 270, 276 according to one embodiment are software packages typically known as "middleware" packages such as MQSeries from IBM, Biztalk from Microsoft, or Tuxedo from BEA Systems. In an alternative example, the collection systems 270, 276 are software packages using the EAI approach such as Tupelo, Method 1, or Universal Connector. In a further alternative, the collection systems are Application Program Interface (API) structures.

Each of the first and second delivery systems 274, 272 are applications configured to deliver information to external systems. In one aspect of the invention, the delivery systems 274, 272 are specially-configured software packages specially tailored to deliver information to specific existing external systems. According to an alternative embodiment, the delivery systems 274, 272 can be any available software package for placing information into an existing external system, such as any of "middleware" software, EAI software, or API structures.

The first system 202 has a database 219, a sync server 224, a first connector 262, and a connector log file 264. The first connector 262 is an application configured to translate and/or validate data or information passing between the first database 219 and the external files or applications. Further, the first connector 262 is further configured according to one embodiment to transmit the data or information to the log file 264 upon transmission failure and subsequently retrieve the data or information from the log file 264. The term connector is not intended to be limiting, but rather, for purposes of this application, is intended to refer to any application configured to provide for, regulate, or participate in electronic communication between a database and an external system, file, database, or application. The first connector log file 264, according to one embodiment, is a database or file. The file 264 can be any known file or database structure that will store data and allow it to be subsequently retrieved and written to the database 219. The first connector is operably connected to the external first collection system 270 and the external first delivery system 272.

The external first collection system 270 has a gathering engine 280 in communication with three external first files 282. Alternatively, the external first collection system 270 may have any number of external first files 282. The gathering engine 280 is an application configured to collect or gather data or information from the external first files 282. According to one embodiment, the gathering engine collects the information by reading the information in any one of the external first files 282 by any known method for reading information in a database and moving or copying the data elsewhere.

The external first files 282, according to one embodiment, are databases. Alternatively, the external first files 282 are data files or data stores. The external first files 282 may be any known file storage systems. The first connector 262 is in communication with the database 219, the connector log file 264, and the gathering engine 280.

The external first delivery system 272 has a delivery engine 284 in communication with three external first files 286. Alternatively, the external first delivery system 272 may have any number of external first files 286. The delivery engine 284 is an application configured to transmit data or information to the external first files 282. According to one embodiment, the delivery engine 284 is any known application for transmitting data to an external database.

The external first files 286, according to one embodiment, are databases. Alternatively, the external first files 286 are applications for performing desired external actions. The external first files 286 may be any known file storage systems for information storage or any known application for performing any desired external actions. The first connector 262 is in communication with the database 219, the connector log file 264, and the delivery engine 284.

The second system 204 has a database 239, a sync server 244, a second connector 266, and a second connector log file 268. The second connector 266 is an application configured to translate and/or validate data or information passing between the second database 239 and the external files or applications. The second connector log file 268, according to one embodiment, is a database or file. The file 268 can be any known file or database structure that will store data and allow it to be subsequently retrieved and written to the database 239.

The second connector 266 is operably connected to the external second delivery system 274 and the external second collection system 276. The external second delivery system 274 has a delivery engine 288 in communication with three external second files 290. Alternatively, the external second delivery system 274 may have any number of external second files 290. The delivery engine 288 is an application configured to transmit data or information to the external second files 290. According to one embodiment, the delivery engine 288 is any known application for transmitting data to an external database.

The external second files 290, according to one embodiment, are databases. Alternatively, the external second files 290 are applications for performing desired external actions. The external second files 290 may be any known file storage systems for information storage or any known application for performing any desired external actions. The second connector 266 is in communication with the database 239, the connector log file 268, and the delivery engine 288.

The external second collection system 276 has a gathering engine 292 in communication with three external second files 294. The gathering engine 292 is configured to collect or gather data or information from the external second files 294. According to one embodiment, the gathering engine 292 collects the information by reading the information in any one of the external second files 294 by any known method for reading information in a database and moving or copying the data elsewhere.

Alternatively, the external second collection system 276 may have any number of external second files 294. The external second files 294, according to one embodiment, are databases. Alternatively, the external second files 294 are data files or data stores. The external second files 294 may be any known file storage systems. The second connector 266 is in communication with the database 239, the connector log file 268, and the gathering engine 292.

In operation, it may be necessary to link the first or second systems to pre-existing external systems in order to place pre-existing information into the system of the present invention. Alternatively, it may be necessary to link the first or second systems to external systems to provide continuing access to information from external systems and to output information or action requests to other external systems. Thus, according to some embodiments, entities with pre-existing systems can connect to the present invention. According to further embodiments, the system and method of the present invention allows for tracking any unsuccessful communications between the system and any pre-existing system. In contrast, existing communication technologies do not allow for connection to and communication with pre-existing systems or the tracking of any failure in such communications.

Figure 21:
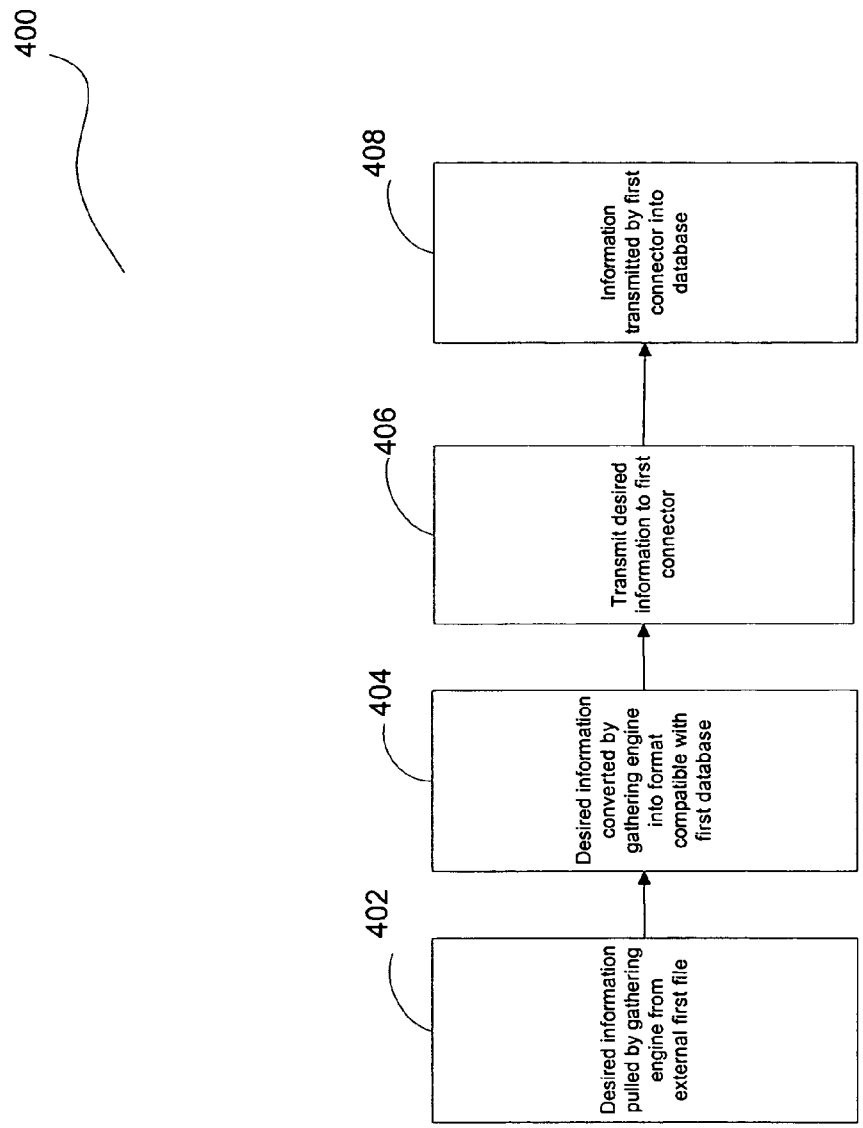
FIG. 21 is a flowchart illustrating a method of accessing external information at a first database system, according to one embodiment of the present invention.

FIG. 21 shows a method of accessing external information at the first system 202 (400) according to one embodiment of the present invention. The gathering engine 280 pulls desired information from one of the external first files 282 (block 402). As mentioned above, according to one embodiment, the gathering engine collects the information by reading the information in any one of the external first files 282 by any known method for reading information in a database and moving or copying the data elsewhere. According to one embodiment, the exact process for reading data is determined by the format or configuration of the external first file 282 to be read. That is, accessing and reading information from a database or file is determined by the configuration of the database or file and the method used to store the information in that database. Thus, various databases have certain configurations, such as SQL database, flat files, BDAM files, VSAM files, or any other known configuration, and each has a specific process for retrieving data from the database. Thus, the gathering engine 280 is configured to be capable of accessing and retrieving data from any of the external first files 282 based on the process required to retrieve data from that file. Alternatively, the gathering engine 280 pulls the desired information from more than one of the external first files 282.

The gathering engine 280 then converts the desired information into a format compatible with the first database 219 (block 404). That is, the gathering engine 280 converts or "maps" the existing format of the desired information to the format of the data in the first database 219. According to one embodiment, the mapping or conversion occurs by any known method for converting information into a format compatible with a particular database. Alternatively, further conversion or translation can occur at the first connector 262, according to known methods of conversion.

Alternatively, if the desired information is already in the appropriate format, the gathering engine validates the desired information. That is, the gathering engine performs a process to ensure that the format and content of the collected information can be written and accepted into the first database 219. Every database has specific requirements, definitions, or rules for determining whether data will be accepted into the database based on the format and content of that data. Thus, the gathering engine is configured to simply ensure that the data being gathered conforms to those requirements. According to one embodiment, the validation can be accomplished by any known validation process. In a further alternative, further validation of the desired information can take place at the first connector 262. After conversion or validation, the desired information is transmitted to the first connector 262 (block 406), which transmits the information into the database 219 (block 408).

Figure 22:
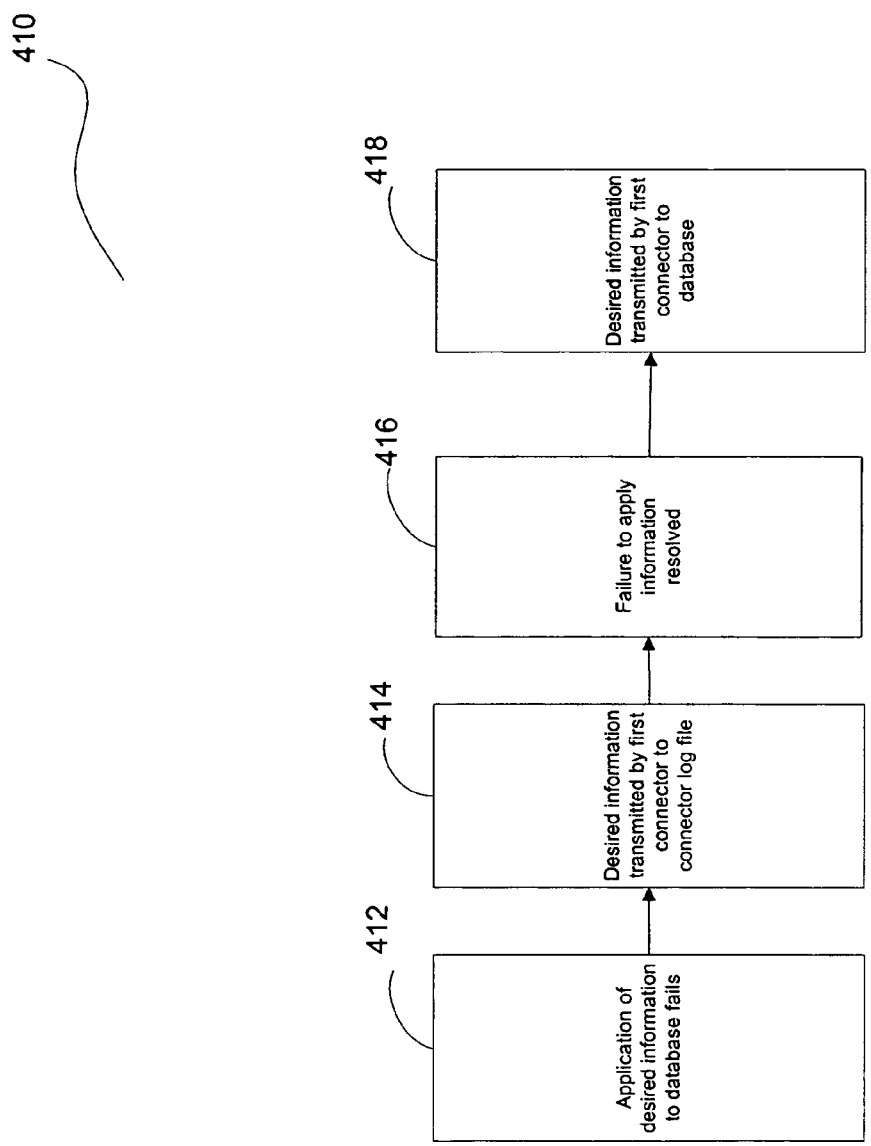
FIG. 22 is a flowchart depicting a method of tracking unsuccessful applications of external information to the first database, according to one embodiment of the present invention.

FIG. 22 shows a method of tracking any unsuccessful applications of desired information to the database 219 from the first connector 262 (410). If the application of the desired information to the database 219 is unsuccessful for any reason (block 412), the first connector transmits the information to the connector log file 264 (block 414). According to one embodiment, the information transmitted to the log file 264 includes the time of the attempted application to the first database 219.

When the failure to apply information to the database 219 is resolved (block 416), the information in the log file 264 is then transmitted by the first connector 262 to the database 219 (block 418). That is, the first connector 262 reads the information at the log file 264 by the known process of reading a record in any database and transmits the information to the database 219. According to one embodiment, if the transmission by the connector 262 to the database 219 is successful, the connector 262 will delete the information from the log file 264 by any known deletion or removal method.

According to an alternative aspect, when the information has been transmitted to the connector log file 264 and prior to the resolution of the failure, the connector 262 transmits a message to the first system administrator, notifying the administrator of the failure. According to one embodiment, the connector 262 is configured in a similar fashion to the unsuccessful transmission log tracker 223 of the first system 202 and "wakes up" or operates at predetermined intervals to read any record present in the log file 264. Upon reading a record in the log file 264, the connector 262 transmits a message to the first system administrator. The message, according to one embodiment, is an e-mail message. Alternatively, the message is a task message, wherein a flashing symbol is posted to the system administrator's monitor screen and when the administrator clicks on the flashing symbol, the message is delivered on the screen. In a further alternative, the message is sent via telecommunication. The message may be in any known communication form. According to one embodiment, the message may include information relating to the unsuccessful application, including the contents of the communication itself, and the time of the unsuccessful application attempt, or any other relevant information.

Figure 23:
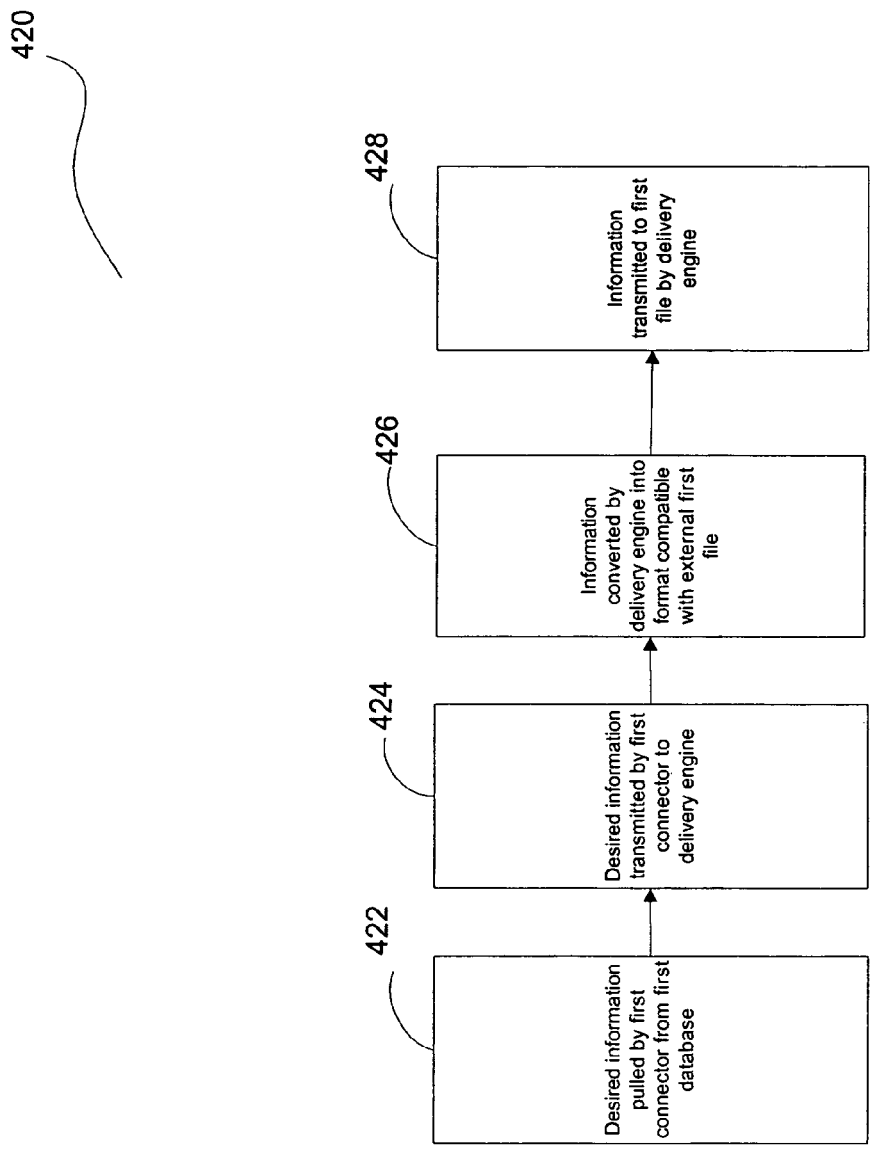
FIG. 23 is a flowchart showing a method of delivering information from a first system to an external system, according to one embodiment of the present invention.

FIG. 23 shows a method of delivering information from the first system 202 to an external system 272 (420), according to one embodiment of the present invention. According to one aspect of the invention, this method of automatic delivery to an external system 272 is a method of STP processing. The first connector 262 pulls desired information from the first database 219 (block 422). That is, the first connector 262 reads the desired information in the first database 219 by any known data reading method. The connector then transmits the information to the delivery engine 284 (block 424).

The delivery engine 284 converts the information into a format compatible with the desired external first file 286 (block 426). That is, the delivery engine 284 converts or "maps" the existing format of the information to the format of the target external second file 286. According to one embodiment, the mapping or conversion occurs by any known method for converting information into a format compatible with a particular database. Alternatively, the delivery engine 284 converts the information into a format compatible with more than one desired external first file 286.

In a further alternative, if the information is already in the appropriate format, the delivery engine 284 validates the information. That is, the delivery engine performs a process to ensure that the format and content of the information can be written and accepted into the external file 286. According to one embodiment, the validation can be accomplished by any known validation process. After conversion and/or validation, the desired information is transmitted to the desired external first file 286 (block 428). According to one embodiment, the delivery engine 284 writes the information into a database at the external file 286. Alternatively, the delivery engine 284 simply transmits the information to the external file 286 and an application at the file 286 writes the information into a database. In another aspect of the present invention, the information is converted or validated at the first connector 262. Alternatively, the desired information is transmitted to more than one desired first file 286. According to one embodiment, the external first file 286 is an application, and the transmission of desired information to the application is an STP action that triggers a desired action at the application. The action may be any known action capable of being triggered at an application.

Information can also be delivered from the second system to an external system and accessed from the external system by the second system, according to one embodiment of the present invention. Further, unsuccessful applications of information to the second database from the second connector can be tracked. Typically, these processes occur in the same manner as described above for the same processes at the first system.

According to an alternative embodiment, the system and method of the present invention provides for tracking and confirming expected communications between database systems in a process that can be called "matching." Matching can be described in the following fashion. In some circumstances, it may be desirable to indicate at a second system that a transaction is expected to occur at a first system. By indicating at the second system what the expected transaction is, the second system can compare the information about the expected transaction to the information about the actual transaction when it is received to determine if the actual transaction occurred as expected. In one exemplary embodiment, the systems are banks and an account holder at a second bank is expecting to receive a deposit of $100 at the first bank, so information about the expected $100 deposit is entered at the second bank. Thus, when the $100 is deposited at the first bank and the transaction information is transmitted to the second bank, the actual transaction information matches the expected transaction information and thus it is known immediately that the transaction occurred in the expected fashion. Conversely, if the deposit at the first bank is only $50, the actual transaction information does not match the expected information and it is known immediately that the transaction did not occur in the expected fashion.

Figure 24:
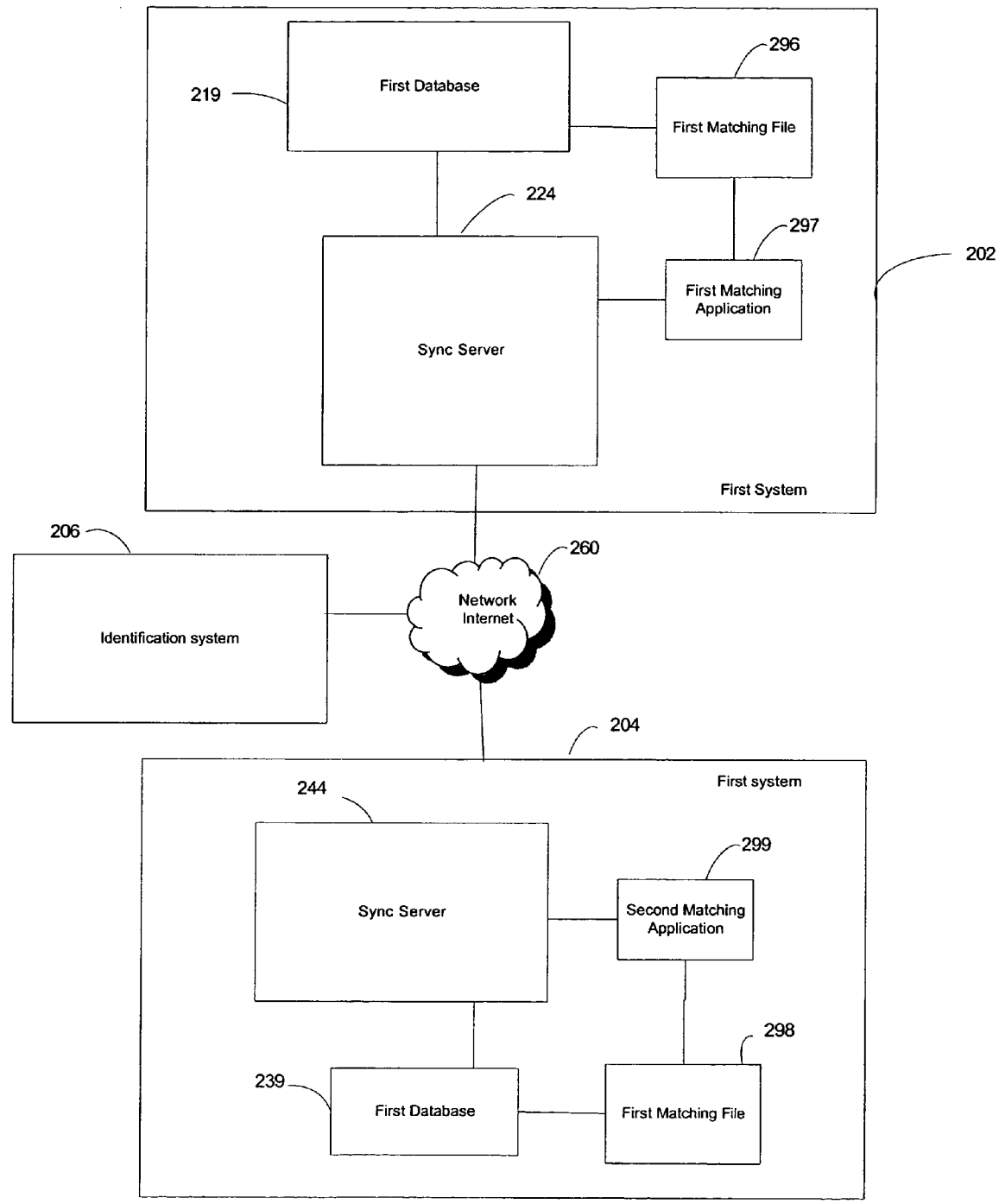
FIG. 24 is a schematic diagram illustrating the architecture of a network-based communication system, according to a further alternative embodiment of the present invention.

An embodiment of the architecture of a network-based communication system allowing for tracking and confirmation of expected communications between database systems is depicted in FIG. 24. The system includes a first database system 202, a second database system 204, and an identification system 206. Alternatively, the network does not have an identification system.

The first system 202 has a database 219, a sync server 224, a first matching file 296, and a first matching application 297. The first matching file 296 is a database configured to receive and store information relating to information that is expected to be received from another database system, which in one example is the second system 204. Alternatively, the matching file 296 is located within the database 219. The first matching application 297 is an application configured to read the matching file 296 and compare actual transaction information with the expected transaction information contained in the matching file 296. The matching application 297 can be any known application for comparing a record received in a communication with a record in a database.

The second system 204 has a database 239, a sync server 244, a second matching file 298, and a second matching application 299. The second matching file 298 is a database configured to receive and store information relating to information that is expected to be received from another database system, which in one example is the first system 202. Alternatively, the matching file is located within the database 239. The second matching application 299 is an application configured to read the matching file 298 and compare actual transaction information with the expected transaction information contained in the matching file 298. The matching application 299 can be any known application for comparing a record received in a communication with a record in a database.

Figure 25:
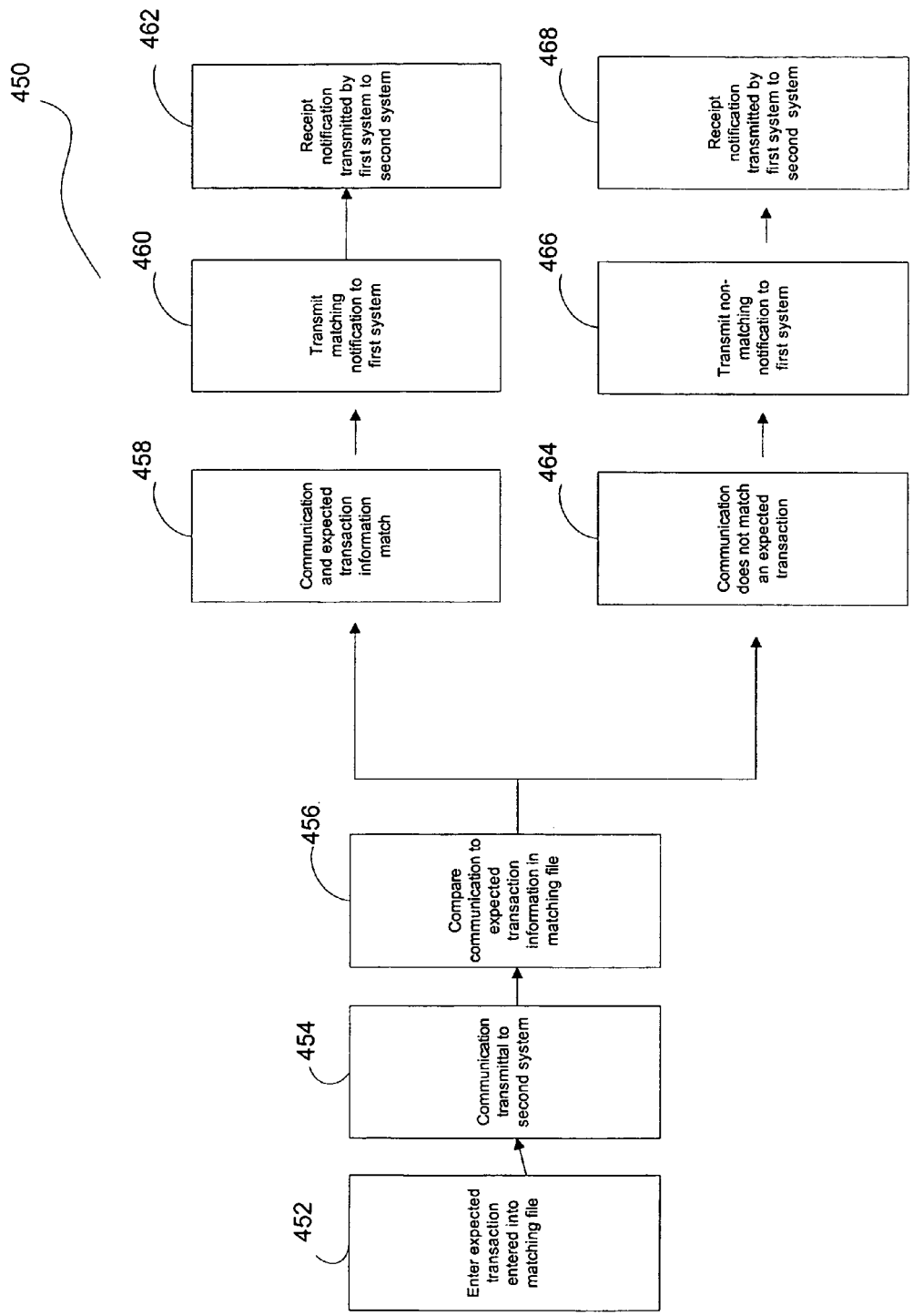
FIG. 25 is a flowchart illustrating a method of matching expected and actual transaction information, according to one embodiment of the present invention.

FIG. 25 shows a method of matching expected and actual information 450 according to one embodiment of the present invention. Information relating to a transaction expected to occur at a first system 202 ("expected transaction") is entered into the matching file 298 at the second system 204 (block 452). That is, information regarding data that is expected to be written into the first database 219 at the first system 202 is written into the matching file 298 at the second system 204. According to one embodiment, the information is entered by an application. Alternatively, the information is entered manually by a user. Once the transaction or writing to the first database 219 actually occurs at the first system 202 and the transaction information relating to the actual transaction is transmitted into the second database 239 (block 454), the actual transaction information is compared to the expected transaction information in the matching file 298 (block 456). That is, the matching application 299 reads the matching file 298 and compares the actual transaction information with the expected transaction information. According to one embodiment, the matching application 299 compares certain predetermined fields in both the expected transaction information and actual transaction information to determine if they are the same. Alternatively, the matching process can occur within the database 239.

If the initial communication and the expected transaction information match (block 458), a matching notification is transmitted to the first system 202 (block 460). That is, the actual information is written into the database 239, along with the matching status, which is included as a separate field in the record, and the process for transmitting a communication to the first system 202 according to the present invention occurs. Upon application of the communication to the first database 219, the first system 202 transmits a receipt notification to the second system 204 (block 462) as is further described above. If, however, the initial communication transmitted to the second system 204 does not match any expected transaction information (block 464), a non-matching notification is transmitted to the first system 202 (block 466). That is, the notification transmitted back to the first system 202 includes information that the actual transaction information did not match with the expected transaction information. Alternatively, if there is a partial match, the notification can include information that the actual transaction information matched partially with the expected transaction information and provide a description of the portions that matched and the portions that did not. Then the first system 202 transmits a receipt notification to the second system 204 (block 468).

The matching, according to one embodiment, can also occur at the first system 202. Typically, the matching occurs in the same manner as described above for the same processes at the second system.

EXAMPLE

Figure 26:
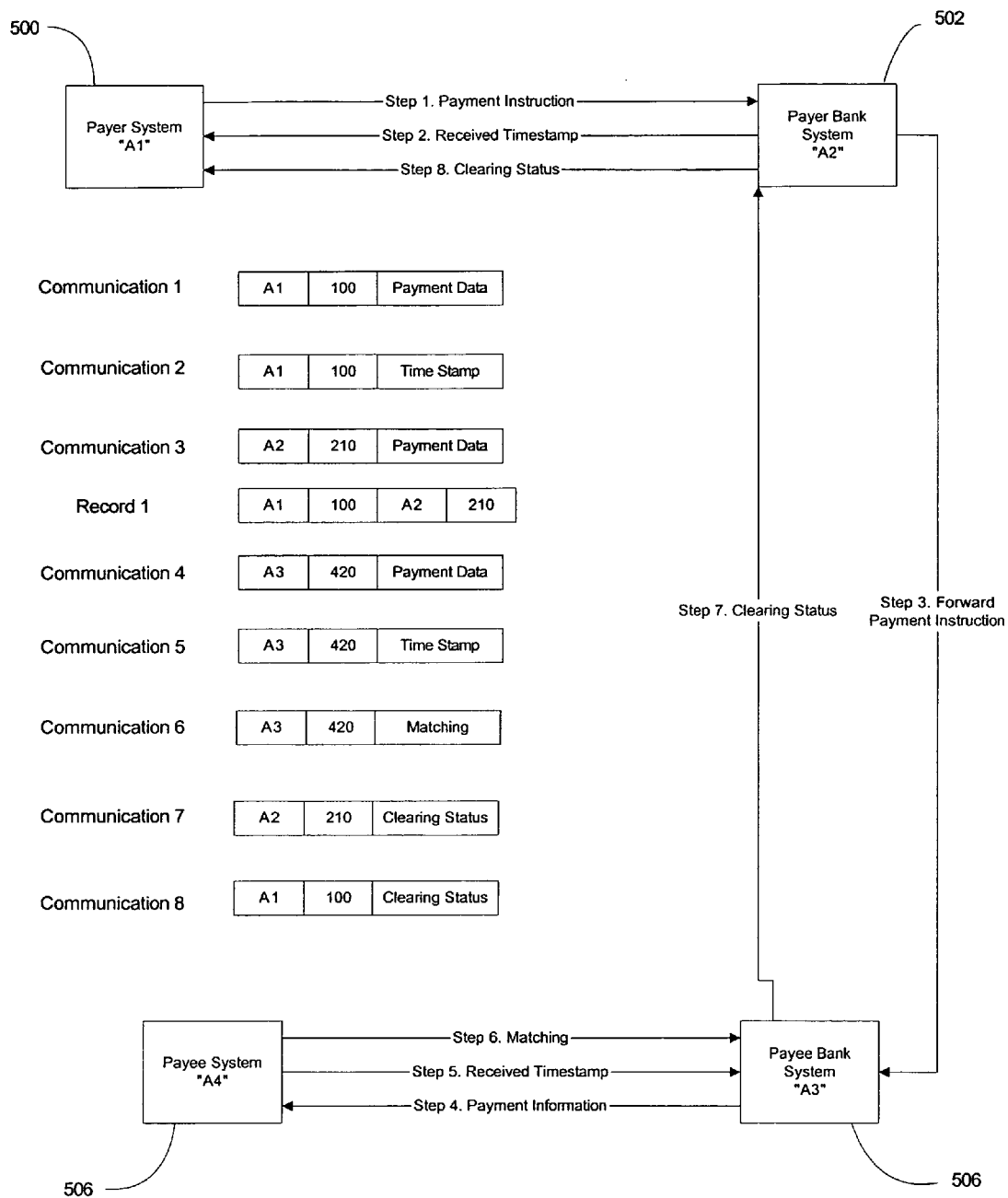
FIG. 26 is a schematic diagram and flowchart illustrating an exemplary banking transaction utilizing a communication network, according to one embodiment of the present invention.

An exemplary banking transaction utilizing a network of the present invention is depicted in FIG. 26. The network, according to the exemplary embodiment, has a payer database system 500, a payer bank database system 502, a payee database system 504, and a payee bank database system 506, all of which are in communication over a network (not shown). The unique ID assigned to the payer database system is A1, while the unique ID assigned to the payer bank system is A2. Further, the unique ID assigned to the payee bank system is A3, and the unique ID assigned to the payee system is A4.

As an example, the payer may be a company that purchases certain goods from the payee. As a result, the payer must withdraw funds from its account at the payer bank and have them deposited at the account of the payee at the payee bank. In this example, the payer and payee have bookkeeping database systems that are connected to their respective banks over the Internet. Thus, the payer company initiates the transaction by writing to the database at its payer database system 500 a payment instruction into a particular account. Thus, the payer system 500 automatically transmits information related to the transaction, which in this case is a payment instruction, to the payer bank system 502 (step 1). The representative communication is shown in FIG. 26 as communication 1. Communication 1 includes the unique ID ("A1") that is written into the record at the payer database. The communication also includes the standard database record ID assigned to the record written into the payer database, which in this case is "100." The combination of the unique ID and the database record ID results in a unique record ID that is unique across the entire exemplary network. Finally, the communication includes the appropriate information relating to the payment (identified in communication 1 as "payment data").

The payer bank system 502 receives the communication 1 and writes it into the payer bank database, associating it with the appropriate account, which is identified in the payment data of communication 1. An automatic receipt notification is generated as disclosed herein and transmitted back to the payer system 500, confirming that the payment instruction of communication 1 was written into the payer bank database (step 2). A representative receipt notification is shown as communication 2. Communication 2 includes the same unique ID and standard record ID as communication 1 so that the receipt notification can be associated with the appropriate record, and thus the appropriate account, at the payer system 500. The communication 2 also includes information relating to the date and time that the communication 1 was written into the payer bank database (referred to on the representative communication 2 as the "time stamp").

As a result of the payment instruction in communication 1, the payer bank system 502 forwards a payment instruction to the payee bank system 504 (step 3). A representative communication including the payment instruction is shown as communication 3. Communication 3 includes the unique ID of the payer bank system ("A2") and a standard record ID ("210") identifying the appropriate record in the payer bank database (the standard record ID having been assigned by the payer bank database at the time the payment instruction was written into the database). Thus, the combination of the unique ID and standard record ID ensure that the record has a unique ID across the exemplary network. Further, the communication 3 includes the payment instruction information, including the identification of the appropriate account. In some embodiments, the communication 3 can be transmitted to the clearing system (not shown) and then forwarded on to the payee bank system. The clearing system is the federal system that monitors all transactions between banks.

In some cases, such as when the payee bank system 504 is located in a foreign country in which the payer bank has no branch or satellite office, the payer bank system 502 will transmit the communication 3 to a correspondent bank system (not shown), which has branches or satellite offices in both the payer bank's country and the payee bank's country. In that case, the communication 3 must be linked or associated with the communication 2 in order to ensure that the relationship between the communications is not lost. That is, an application in the payer bank system 502 writes to a linking database a record that associates the unique ID of the communication 1 with the unique ID of communication 3. A representative record including the unique IDs of communications 1 and 3 is shown as record 1. Thus, if any communications relating to communication 3 are received at the payer bank system, it is known that the communication relates also to communication 1 and appropriate communications relating to communication 1 can be transmitted to the payer system 500.

When the payment instruction is received at the payee bank system 504, the communication is processed as disclosed herein and a communication is transmitted from the payee bank system 504 to the payee 506, providing payment information to the payee system 506 (step 4). A representative communication including the payment information is shown as communication 4. Communication 4 includes the unique ID of the payee bank system ("A3") and a standard record ID ("420") identifying the appropriate record in the payee bank database (the standard record ID having been assigned by the payee bank database at the time the payment instruction was written into the database). Thus, the combination of the unique ID and standard record ID ensure that the record has a unique ID across the exemplary network. Further, the communication 4 includes the payment information, including the identification of the appropriate account.

The payee system 506 receives the communication 4 and writes it into the payee database, associating it with the appropriate account, which is identified in the payment data of communication 4. An automatic receipt notification is generated as disclosed herein and transmitted back to the payee bank system 504, confirming that the payment information of communication 4 was written into the payee database (step 5). A representative receipt notification is shown as communication 5. Communication 5 includes the same unique ID and standard record ID as communication 4 so that the receipt notification can be associated with the appropriate record, and thus the appropriate account, at the payee bank system. The communication 5 also includes information relating to the date and time that the communication 4 was written into the payee database (referred to on the representative communication 5 as the "time stamp").

According to one embodiment, the matching function of the present invention is also utilized in this example. That is, prior to the initiation of the actual transaction at the payer system 500, a user at the payee company entered information about the expected transaction at the payee database. For example, the payee company may have sold certain goods to the payer company at a certain price, and thus entered that amount into the payee database as a payment amount that was expected to be received at the payee database. Thus, when the actual payment information is written into the payee database, it is compared to the information about the expected payment. In this example, the actual payment information matches the expected payment information, so a matching status notification is transmitted to the payee bank system 504 that indicates that the information matches (step 6). A representative matching status notification is shown as communication 6. Communication 6 includes the same unique ID and standard record ID as communication 5 so that the matching status can be associated with the appropriate record, and thus the appropriate account, at the payee bank system 504. The communication 6 also includes the matching information. Alternatively, the communication 6 can include the payee system unique ID ("A4") and a new standard database record ID, and would be associated with the appropriate record as a result of a reference in the communication to the original payment communication ID of "A3" and "420."

When the payment has been cleared by the clearing system, the clearing system will obtain the funds from the payer bank and send the funds to the payee bank. Upon receipt of the funds, the payee bank system 504 will transmit a communication to the payer bank system 502, providing information relating to the receipt of the funds (or "clearing status") to the payer system 502 (step 7). If the payment is not cleared by the clearing system, the clearing status communication will notify the payer system 502 that the payment was not received. A representative communication including the clearing status information is shown as communication 7. Communication 7 includes the same unique ID and standard record ID as communication 3 so that the clearing status can be associated with the appropriate record, and thus the appropriate account, at the payer bank system. The communication 7 also includes the clearing status information. Alternatively, the communication 7 can include the payee bank system unique ID ("A3") and a new standard database record ID, and would be associated with the appropriate record as a result of a reference in the communication to the original payment communication ID of "A2" and "210," or as a result of the association between the communications as recorded in the linking database at the payer bank system 502.

When communication 7 containing the clearing status is received at the payer bank system 502, the communication is associated with the payment instruction of communication 1 either by the linking database or the reference to the original payment communication of communication 3. Upon receipt of the communication 7, the payer bank system 502 will transmit a communication to the payer system 500, providing clearing status information to the payer system (step 8). If the payment is not cleared by the clearing system, the clearing status communication will notify the payer system 500 that the payment was not received. A representative communication including the clearing status information is shown as communication 8. Communication 8 includes the same unique ID and standard record ID as communication 1 so that the clearing status can be associated with the appropriate record, and thus the appropriate account, at the payer system 500. The communication 8 also includes the clearing status information. Alternatively, the communication 8 can include the payer bank system unique ID ("A2") and a new standard database record ID, and would be associated with the appropriate record as a result of a reference in the communication to the original payment communication ID of "A1" and "100," or as a result of the association between the communications as recorded in the linking database at the payer bank system 502.

FIG. 27 is a screen shot depicting a transaction monitor configured to track transactions at a first system with another system, according to one embodiment of the present invention. For example, according to one embodiment, FIG. 27 could be showing transactions being tracked at the payer bank system in the above example. Each transaction report includes the account number associated with the transaction 510, the time the automatic communication associated with the transaction was sent to the payee bank system 512, the time the communication was received by the payee bank system (as provided by the receipt notification sent by the payee bank system) 514, the matching or reconciliation status 516, the time that the transaction was matched or reconciled by the payee bank system 518, and the time that the reconciliation or matching status notification was received by the payer bank system 520.

Although the present invention has been described with reference to preferred embodiments, persons skilled in the art will recognize that changes may be made in form and detail without departing from the spirit and scope of the invention.

I claim:

1. A database communication network comprising:
   a first database system, comprising:
      a first database; and
      a first server configured to receive first information from the first database and transmit the first information out of the first database system;
   a first translation component operating on the first server, comprising:
      a first dictionary component comprising format information for any database system in communication with the first database system; and a first translator component configured to utilize format information from the first dictionary component and translate the first information into a format compatible with any database system in communication with the first database system;
   a second database system in communication with the first database system; and
   an identification system in communication with each of the first and second database systems, the identification system configured to assign unique identification to data stored within each of the first and second database systems;
   wherein the first database system, second database system, and identification system are configured to support direct and indirect communication with each other.

2. The database communication network of claim 1 wherein the unique identification of data includes providing a first unique database identification schema to databases within the first database system and providing a second unique database identification schema to databases within the second database system.

3. The database communication network of claim 2 wherein the first and second unique database identifications schemas result in the identification system attaching unique identification for each record existing in the database communication network.

4. The database communication network of claim 1, wherein the first server comprises a first communication component configured to identify a database system in communication with the first database system to receive the first information.

5. The database communication network of claim 1, further comprising a first matching component in communication with the first database, the first matching component configured to receive information regarding an expected first transaction and compare the information regarding the expected first transaction with information regarding an actual first transaction at the first database.

6. The database communication network of claim 5, wherein the first matching component is further configured to cause a first matching notification to be transmitted out of the first database system if the information regarding the expected first transaction matches the information regarding the actual first transaction.

7. The database communication network of claim 5, wherein the first matching component is further configured to cause a first non-matching notification to be transmitted out of the first database system if the information regarding the expected first transaction does not match the information regarding the actual first transaction.

8. The database communication network of claim 1, wherein the second database system comprises:
a second database; and
a second server configured to receive second information from the second database and transmit the second information out of the second database system.

9. The database communication network of claim 8, wherein the second server comprises a second communication component configured to identify a database system in communication with the second database system to receive the second information.

10. The database communication network of claim 8, wherein the second server comprises a second translation component configured to translate the second information into a format compatible with any database system in communication with the second database system.

11. The database communication network of claim 10, wherein the second translation component comprises:
a second dictionary component comprising format information for any database system in communication with the second database system; and
a second translator component configured to utilize format information from the second dictionary component to translate the second information into a format compatible with any database system in communication with the second database system.

12. The database communication network of claim 8, further comprising a second matching component in communication with the second database, the second matching component configured to receive information regarding an expected second transaction and compare the information regarding the expected second transaction with information regarding an actual second transaction received at the second database.

13. The database communication network of claim 12, wherein the second matching component is further configured to cause a second matching notification to be transmitted out of the second database system if the information regarding the expected second transaction matches the information regarding the actual second transaction.

14. The database communication network of claim 12, wherein the second matching component is further configured to cause a second non-matching notification to be transmitted out of the second database system if the information regarding the expected second transaction does not match the information regarding the actual second transaction.

15. The database communication network of claim 8, wherein the second database system further comprises:
a second transmission tracker file in communication with the second server, the second transmission tracker file configured to receive second information that could not be transmitted out of the second database system; and a second transmission time tracking component in communication with the second transmission tracker file, the second transmission time tracking component configured to track a period of time that the second information could not be transmitted, the second time tracking component further configured to transmit a message to an administrator after a predefined period of time.

16. The database communication network of claim 8, wherein the second database system further comprises:
an second application tracker file in communication with the second server, the second application tracker file configured to receive information that could not be applied to the second database; and
a second application time tracking component in communication with the second application tracker file, the second application time tracking component configured to track a period of time that the information could not be applied, the second application time tracking component further configured to transmit a message to an administrator after a predefined period of time.

17. The database communication network of claim 1, further comprising a first external system in communication with the first database system.

18. The database communication network of claim 17, wherein the first database system further comprises a first connection component in communication with the first database and the first external system.

19. The database communication network of claim 18, wherein the first external system is configured to input data into the first database system, the first external system comprising:
a first gathering component in communication with the first connection component, the first gathering component configured to receive external data and transmit the external data to the first connection component; and
at least one first external file in communication with the first gathering component, the at least one first external file configured to provide the external data to the first gathering component.

20. The database communication network of claim 18, wherein the first external system is configured to receive data from the first database system, the first external system comprising:
a first delivery component in communication with the first connection component, the first delivery component configured to receive data from the first connection component and transmit the data; and
at least one first external file in communication with the first delivery component, the at least one first external file configured to receive the data from the first delivery component.

21. The database communication network of claim 17, further comprising a second external system in communication with the second database system.

22. The database communication network of claim 21, wherein the second database system further comprises a second connection component in communication with the second database and the second external system.

23. The database communication network of claim 22, wherein the second external system is configured to input data into the second database system, the second external system comprising:
a second gathering component in communication with the second connection component, the second gathering component configured to receive external data and transmit the external data to the second connection component; and at least one second external file in communication with the second gathering component, the at least one second external file configured to provide the external data to the second gathering component.

24. The database communication network of claim 22, wherein the second external system is configured to receive data from the second database system, the second external system comprising:
   a second delivery component in communication with the second connection component, the second delivery component configured to receive data from the second connection component and transmit the data; and
   at least one second external file in communication with the second delivery component, the at least one second external file configured to receive the data from the second delivery component.

25. The database communication network of claim 1, wherein the first database system further comprises:
   a first transmission tracker file in communication with the first server, the first transmission tracker file configured to receive the first information that could not be transmitted out of the first database system; and
   a first transmission time tracking component in communication with the first transmission tracker file, the first transmission time tracking component configured to track a period of time that the first information could not be transmitted, the time tracking component further configured to transmit a message to an administrator after a predefined period of time.

26. The database communication network of claim 1, wherein the first database system further comprises:
   a first application tracker file in communication with the first server, the first application tracker file configured to receive information that could not be applied to the first database; and
   a first application time tracking component in communication with the first application tracker file, the first application time tracking component configured to track a period of time that the information could not be applied, the time tracking component further configured to transmit a message to an administrator after a predefined period of time.

27. A database system comprising:
   a database;
   a server configured to receive information from the database and transmit the information out of the database;
   a translation component operating on the server, comprising:
      a dictionary component comprising format information for any database in communication with the database system;
      a translator component configured to utilize the format information from the dictionary component and translate the information from the database into a format compatible with any database in communication with the database system; and
   a matching component in communication with the database, the matching component configured to receive information regarding an expected transaction and compare the information regarding the expected transaction with information regarding an actual transaction at the database;
   wherein direct or indirect communication occurs between the database and matching component.

28. The database system of claim 27, wherein the matching component is further configured to cause a matching notification to be transmitted out of the database system if the information regarding the expected transaction matches the information regarding the actual transaction.

29. A database communication network comprising:
   a first database system comprising:
      a first database configured to receive data; and
      a first server comprising a first communication component configured upon receipt of data into the first database to identify a database system in communication with the first database system, to receive first information, and to transmit the first information out of the first database;
      a first translation component operating on the first server, comprising:
         a first dictionary component comprising format information for database systems in communication with the first database system; and
         a first translator component configured to utilize format information from the first dictionary component and translate the first information into a format compatible with database systems in communication with the first database system;
   a second database system in communication with the first database system, the second database system comprising:
      a second database configured to receive data; and
      a second server comprising a second communication component configured upon receipt of data into the second database to identify a database system in communication with the second database system, to receive second information, and to transmit the second information out of the second database;
      a second translation component operating on the second server, comprising:
         a second dictionary component comprising format information for database systems in communication with the second database system; and
         a second translator component configured to utilize format information from the second dictionary component and translate the second information into a format compatible with database systems in communication with the second database system; and
   an identification system in communication with each of the first and second database systems, the identification system configured to assign unique identification to data stored within each of the first and second database systems;
   wherein the first database system, second database system, and identification system are configured to support direct and indirect communication with each other.

30. A communication network comprising:
   at least two database systems, each of the at least two database systems comprising:
      a database;
      a server associated with the database, the server comprising a communication component configured to receive outgoing information from the database, identify at least one of the at least two database systems to receive the outgoing information, and transmit the outgoing information to the at least one of the at least two database systems;
      a translation component operating on the server, comprising:
         a dictionary component comprising format information for each of the at least two database systems in communication with the database; and
         a translator component configured to utilize format information from the dictionary component and translate the information from the database into a format compatible with each of the at least two database systems in communication with the database;

a connection component in communication with the database; and at least one external system, each of the at least one external systems in communication with the connection component of one of the at least two database systems;

wherein the at least two database systems are configured to support direct and indirect communication with each other.

31. The communication network of claim 30, wherein the at least one external system is configured to input data into the database system with which the at least one external system is in communication, the at least one external system comprising:

a gathering component in communication with the connection component, the gathering component configured to receive external data and transmit the external data to the connection component; and at least one external file in communication with the gathering component, the at least one external file configured to provide the external data to the gathering component.

32. The communication network of claim 30, wherein the at least one external system is configured to receive data from the database system with which the at least one external system is in communication, the at least one external system comprising:

a delivery component in communication with the connection component, the delivery component configured to receive data from the connection component and transmit the data; and at least one external file in communication with the delivery component, the at least one external file configured to receive the data from the delivery component.

33. A method of network-based communication comprising:

automatically transmitting information out of a first database with assistance from a first transmission component within the first database upon input of data into the first database;

providing a dictionary component comprising format information for a second database in communication with the first database;

providing a translator component configured to utilize the format information from the dictionary component and translate the information transmitted out of the first database into a format compatible with the second database;

adding time information to the information; and transmitting the information to the second database via direct or indirect communication to the second database.

34. The method of claim 33, further comprising connecting the first database to a first external system.

35. The method of claim 34, further comprising receiving data at the first database from the first external system.

36. The method of claim 33, wherein adding time information to the notification information further comprises adding date information to the notification information.

37. The method of claim 33, further comprising:

receiving the notification information at the second database; automatically transmitting receipt information out of the second database with assistance from a second transmission component within the second database upon input of the notification information into the second database;

adding time information to the receipt information; and transmitting the receipt information to the first database.

38. The method of claim 37, further comprising connecting the second database to a second external system.

39. The method of claim 38, further comprising transmitting the notification information to the second external system.

40. The method of claim 37, wherein adding time information to the receipt information further comprises adding date information to the receipt information.

* * * * *

UNITED STATES PATENT AND TRADEMARK OFFICE
CERTIFICATE OF CORRECTION

PATENT NO.       : 7,584,197 B2
APPLICATION NO.  : 10/802661
DATED            : September 1, 2009
INVENTOR(S)      : Robert Dant It is certified that error appears in the above-identified patent and that said Letters Patent is hereby corrected as shown below:

Claim 3, column 34, line 54, replace "identifications" with --identification--

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO.       : 7,584,197 B2                                    Page 1 of 1
APPLICATION NO. : 10/802661
DATED            : September 1, 2009
INVENTOR(S)      : Robert Dant It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this

Fourteenth Day of December, 2010

David J. Kappos
*Director of the United States Patent and Trademark Office*